United States Patent
Liu et al.

(10) Patent No.: US 12,476,765 B2
(45) Date of Patent: Nov. 18, 2025

(54) SYSTEMS AND METHODS FOR COMBINATIONS OF THE SUBCARRIER SPACING OF PUSCH AND THE SUBCARRIER SPACING OF PRACH

(71) Applicant: ZTE CORPORATION, Guangdong (CN)

(72) Inventors: Juan Liu, Shenzhen (CN); Li Tian, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 405 days.

(21) Appl. No.: 18/148,215

(22) Filed: Dec. 29, 2022

(65) Prior Publication Data
US 2023/0179384 A1 Jun. 8, 2023

Related U.S. Application Data

(63) Continuation of application No. PCT/CN2020/137851, filed on Dec. 21, 2020.

(51) Int. Cl.
*H04L 5/00* (2006.01)
*H04W 74/0833* (2024.01)

(52) U.S. Cl.
CPC ....... *H04L 5/0092* (2013.01); *H04W 74/0833* (2013.01)

(58) Field of Classification Search
CPC ... H04L 5/0092; H04L 5/0007; H04L 5/0094; H04W 74/0833; H04W 74/004
See application file for complete search history.

(56) References Cited

U.S. PATENT DOCUMENTS

| | | |
|---|---|---|
| 2017/0359839 A1 | 12/2017 | Wang et al. |
| 2019/0215877 A1 | 7/2019 | Qian et al. |
| 2019/0320463 A1 | 10/2019 | Yamada et al. |
| 2020/0281026 A1 | 9/2020 | Yan et al. |

(Continued)

FOREIGN PATENT DOCUMENTS

| | | |
|---|---|---|
| CN | 109803446 A | 5/2019 |
| CN | 110768766 A | 2/2020 |
| EP | 4 124 148 A1 | 1/2023 |

(Continued)

OTHER PUBLICATIONS

Notice of Reasons for Rejection for JP App. No. 2022-581469 dated Feb. 2, 2024 (with English translation, 11 pages).

(Continued)

*Primary Examiner* — Charles C Jiang
*Assistant Examiner* — Margaret Marie Anderson
(74) *Attorney, Agent, or Firm* — Foley & Lardner LLP

(57) ABSTRACT

Systems, methods and devices for establishing combinations of PUSCH subcarrier spacing and PRACH subcarrier spacing may include a wireless communication device determining a number of resource blocks to be occupied by a random access (RA) preamble and a PRACH frequency position parameter. The wireless communication device may allocate the resource blocks to the RA preamble according to the number of resource blocks to be occupied by the RA preamble and the PRACH frequency position parameter. The wireless communication device may transmit the RA preamble to a wireless communication node according to the allocated resource blocks.

8 Claims, 5 Drawing Sheets

(56) References Cited

U.S. PATENT DOCUMENTS

2023/0043012 A1* 2/2023 Huang ................ H04W 74/002

FOREIGN PATENT DOCUMENTS

JP      2023-521781 A        5/2023
WO      WO-2018/160111 A1    9/2018
WO      WO-2021203374 A1 *  10/2021   ........... H04L 5/0007

OTHER PUBLICATIONS

First Office Action for CN Appl. No. 202311613763.9, dated May 28, 2024 (with English translation, 16 pages).
Extended European Search Report on EP 20966205.5 dated Jun. 23, 2023 (8 pages).
Huawei: "Correction to PRACH resource configuration for high speed scenario in TS 36.211" 3GPP TSG-RAN WG1 Meeting #88; R1-1704132; Feb. 17, 2017; Athens, Greece (15 pages).
International Search Report and Written Opinion for PCT Appl. No. PCT/CN2020/137851, mailed Sep. 24, 2021 (8 pages).

* cited by examiner

SYSTEMS AND METHODS FOR COMBINATIONS OF THE SUBCARRIER SPACING OF PUSCH AND THE SUBCARRIER SPACING OF PRACH

CROSS-REFERENCE TO RELATED APPLICATION

This application claims the benefit of priority under 35 U.S.C. § 120 as a continuation of PCT Patent Application No. PCT/CN2020/137851, filed on Dec. 21, 2020, the disclosure of which is incorporated herein by reference in its entirety.

TECHNICAL FIELD

The disclosure relates generally to wireless communications, including but not limited to systems and methods for combinations of the subcarrier spacing of PUSCH and the subcarrier spacing of PRACH.

BACKGROUND

The standardization organization Third Generation Partnership Project (3GPP) is currently in the process of specifying a new Radio Interface called 5G New Radio (5G NR) as well as a Next Generation Packet Core Network (NG-CN or NGC). The 5G NR will have three main components: a 5G Access Network (5G-AN), a 5G Core Network (5GC), and a User Equipment (UE). In order to facilitate the enablement of different data services and requirements, the elements of the 5GC, also called Network Functions, have been simplified with some of them being software based, and some being hardware based, so that they could be adapted according to need.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

At least one aspect is directed to a system, method, apparatus, or a computer-readable medium. A wireless communication device may determine a number of resource blocks to be occupied by a random access preamble $$(N_{RB}^{RA}),$$

and a physical random access channel (PRACH) frequency position parameter ($\bar{k}$). The wireless communication device may allocate the resource blocks to the random access preamble according to $$N_{RB}^{RA}$$

and $\bar{k}$. The number of resource blocks to be occupied by a random access preamble $$N_{RB}^{RA}$$

may satisfy at least one of $$N_{RB}^{RA} = \text{ceil}((L_{RA} \cdot \Delta f_{RA})/(\Delta f \cdot M)) \text{ or } N_{RB}^{RA} \le N_{RB}^{\prime RA} = 2^{\alpha_1} \cdot 3^{\alpha_2} \cdot 5^{\alpha_3},$$

where $$N_{RB}'$$

represents a bandwidth of the random-access (RA) preamble in terms of resource blocks, and each of $\alpha_1$, $\alpha_2$ and $\alpha_3$ is a non-negative integer. The PRACH frequency position parameter $\bar{k}$ may be one value from a set of non-negative integer values. A largest value in the set may be $$\text{ceil}((M \cdot N_{RB}^{RA} \cdot \Delta f - L_{RA} \cdot \Delta f_{RA})/\Delta f_{RA}),$$

where $L_{RA}$ is a length of the RA preamble in terms of resource elements, $\Delta f$ is a subcarrier spacing for a physical uplink shared channel (PUSCH), $\Delta f_{RA}$ is a subcarrier spacing for the RA preamble, and M is a number of resource elements in one resource block.

In some embodiments, the wireless communication device may allocate the resource blocks to the RA preamble according to $$N_{RB}^{RA}$$

and $\bar{k}$, and according to at least one of $L_{RA}$, $\Delta f$ or $\Delta f_{RA}$. The wireless communication device may allocate the resource blocks to the RA preamble according to (i) $\Delta f_{RA}$=120 KHz, $\Delta f$=120 KHz, $L_{RA}$=139, $$N_{RB}^{RA} = 12,$$

and $\bar{k}$ being a value from {0, 1, 2, 3, 4, 5}, (ii) $\Delta f_{RA}$=120 KHz, $\Delta f$=120 KHz, $L_{RA}$=283, $$N_{RB}^{RA} = 24,$$

and $\bar{k}$ being a value from {0, 1, 2, 3, 4, 5}, (iii) $\Delta f_{RA}$=120 KHz, f=120 KHz, $L_{RA}$=839, $$N_{RB}^{RA} = 70,$$

and $\bar{k}$ being a value from {0,1}, (iv) $\Delta f_{RA}$=120 KHz, $L_{RA}$=839, $$N_{RB}^{RA} = 72,$$

$\bar{k}$ being a value from {0, 1, 2, 3, 4, 5, 6, 7, 8, 9, 10, 11, 12, 13, 14, 15, 16, 17, 18, 19, 20, 21, 22, 23, 24, 25} and $\alpha_1$=3, $\alpha_2$=2 and $\alpha_3$=0, (v) $\Delta f_{RA}$=120 KHz, $\Delta f$=120 KHz, $L_{RA}$=571, $$N_{RB}^{RA} = 48,$$

and $\bar{k}$ being a value from {0, 1, 2, 3, 4, 5}, or (vi) $\Delta f_{RA}$=120 KHz, $\Delta f$=120 KHz, $L_{RA}$=1151, $$N_{RB}^{RA} = 96,$$

and $\bar{k}$ being a value from {0, 1}.
In some embodiments, the wireless communication device may allocate the resource blocks to the RA preamble according to (i) $f_{RA}$=120 KHz, $\Delta f$=240 KHz, $L_{RA}$=139, $$N_{RB}^{RA} = 6,$$

and
$\bar{k}$ being a value from {0, 1, 2, 3, 4, 5}, (ii) $\Delta f_{RA}$=120 KHz, $\Delta f$=240 KHz, $L_{RA}$=283, $$N_{RB}^{RA} = 12,$$

and $\bar{k}$ being a value from {0, 1, 2, 3, 4, 5}, (iii) $\Delta f_{RA}$=120 KHz, $\Delta f$=240 KHz, $L_{RA}$=839, $$N_{RB}^{RA} = 35,$$

and $\bar{k}$ being a value from {0, 1}, (iv) $\Delta f_{RA}$=120 KHz, $\Delta f$=240 KHz, $L_{RA}$=839, $$N_{RB}^{RA} = 36,$$

$\bar{k}$ being a value from {0, 1, 2, 3, 4, 5, 6, 7, 8, 9, 10, 11, 12, 13, 14, 15, 16, 17, 18, 19, 20, 21, 22, 23, 24, 25} and $\alpha_1$=2, $\alpha_2$=2 and $\alpha_3$=0, (v) $\Delta f_{RA}$=120 KHz, $\Delta f$=240 KHz, $L_{RA}$=571, $$N_{RB}^{RA} = 24,$$

and $\bar{k}$ being a value from {0, 1, 2, 3, 4, 5}, or (vi) $\Delta f_{RA}$=120 KHz, $\Delta f$=240 KHz, $L_{RA}$=1151, $$N_{RB}^{RA} = 48,$$

and $\bar{k}$ being a value from {0, 1}.
In some embodiments, the wireless communication device may allocate the resource blocks to the RA preamble according to (i) $\Delta f_{RA}$=120 KHz, $\Delta f$=480 KHz, $L_{RA}$=139, $$N_{RB}^{RA} = 3,$$

and $\bar{k}$ being a value from {0, 1, 2, 3, 4, 5}, (ii) $\Delta f_{RA}$=120 KHz, $\Delta f$=480 KHz, $L_{RA}$=283, $$N_{RB}^{RA} = 6,$$

and $\bar{k}$ being a value from {0, 1, 2, 3, 4, 5}, (iii) $\Delta f_{RA}$=120 KHz, $\Delta f$=480 KHz, $L_{RA}$=839, $$N_{RB}^{RA} = 18$$

and $\bar{k}$ being a value from {0, 1, 2, 3, 4, 5, 6, 7, 8, 9, 10, 11, 12, 13, 14, 15, 16, 17, 18, 19, 20, 21, 22, 23, 24, 25}, (iv) $\Delta f_{RA}$=120 KHz, $\Delta f$=480 KHz, $L_{RA}$=571, $$N_{RB}^{RA} = 12$$

and $\bar{k}$ being a value from {0, 1, 2, 3, 4, 5}, or (v) $\Delta f_{RA}$=120 KHz, $\Delta f$=480 KHz, $L_{RA}$=1151, $$N_{RB}^{RA} = 24$$

and $\bar{k}$ being a value from {0, 1}.
In some embodiments, the wireless communication device may allocate the resource blocks to the RA preamble according to (i) $f_{RA}$=120 KHz, $\Delta f$=960 KHz, $L_{RA}$=139, $$N_{RB}^{RA} = 2,$$

and $\bar{k}$ being a value from {0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53}, (ii) $f_{RA}$=120 KHz, $\Delta f$=960 KHz, $L_{RA}$=283, $$N_{RB}^{RA} = 3,$$

and $\bar{k}$ being a value from {0, 1, 2, 3, 4, 5}, (iii) $f_{RA}$=120 KHz, $\Delta f$=960 KHz, $L_{RA}$=839, $$N_{RB}^{RA} = 9$$

and $\bar{k}$ being a value from {0, 1, 2, 3, 4, 5, 6, 7, 8, 9, 10, 11, 12, 13, 14, 15, 16, 17, 18, 19, 20, 21, 22, 23, 24, 25}, (iv) $\Delta f_{RA}$=120 KHz, $\Delta f$=960 KHz, $L_{RA}$=571, $$N_{RB}^{RA} = 6$$

and $\bar{k}$ being a value from {0, 1, 2, 3, 4, 5}, or (v) $\Delta f_{RA}$=120 KHz, $\Delta f$=960 KHz, $L_{RA}$=1151, $$N_{RB}^{RA} = 12$$

and $\bar{k}$ being a value from {0, 1}.

In some embodiments, the wireless communication device may allocate the resource blocks to the RA preamble according to (i) $f_{RA}$=240 KHz, $\Delta f$=120 KHz, $L_{RA}$=139, $$N_{RB}^{RA} = 24,$$

and $\bar{k}$ being a value from {0, 1, 2, 3, 4, 5}, (ii) $f_{RA}$=240 KHz, $\Delta f$=120 KHz, $L_{RA}$=283, $$N_{RB}^{RA} = 48,$$

and $\bar{k}$ being a value from {0, 1, 2, 3, 4, 5}, (iii) $f_{RA}$=240 KHz, $\Delta f$=120 KHz, $L_{RA}$=839, $$N_{RB}^{RA} = 140,$$

and $\bar{k}$ being a value from {0, 1}, (iv) $\Delta f_{RA}$=240 KHz, $\Delta f$=120 KHz, $L_{RA}$=839, $$N_{RB}^{RA} = 144,$$

$\bar{k}$ being a value from {0, 1, 2, 3, 4, 5, 6, 7, 8, 9, 10, 11, 12, 13, 14, 15, 16, 17, 18, 19, 20, 21, 22, 23, 24, 25} and $\alpha_1$=4, $\alpha_2$=2 and $\alpha_3$=0, (v) $\Delta f_{RA}$=240 KHz, $\Delta f$=120 KHz, $L_{RA}$=571, $$N_{RB}^{RA} = 96,$$

and $\bar{k}$ being a value from {0, 1, 2, 3, 4, 51}, or (vi) $\Delta f_{RA}$=240 KHz, $\Delta f$=120 KHz, $L_{RA}$=1151, $$N_{RB}^{RA} = 192,$$

and $\bar{k}$ being a value from {0, 1}.

In some embodiments, the wireless communication device may allocate the resource blocks to the RA preamble according to (i) $\Delta f_{RA}$=240 KHz, $\Delta f$=240 KHz, $L_{RA}$=139, $$N_{RB}^{RA} = 12,$$

and $\bar{k}$ being a value from {0, 1, 2, 3, 4, 51}, (ii) $f_{RA}$=240 KHz, $\Delta f$=240 KHz, $L_{RA}$=283, $$N_{RB}^{RA} = 24,$$

and $\bar{k}$ being a value from {0, 1, 2, 3, 4, 51}, (iii) $f_{RA}$=240 KHz, $\Delta f$=240 KHz, $L_{RA}$=839, $$N_{RB}^{RA} = 70,$$

and $\bar{k}$ being a value from {0, 1}, (iv) $f_{RA}$=240 KHz, $\Delta f$=240 KHz, $L_{RA}$=839, $$N_{RB}^{RA} = 72,$$

$\bar{k}$ being a value from {0, 1, 2, 3, 4, 5, 6, 7, 8, 9, 10, 11, 12, 13, 14, 15, 16, 17, 18, 19, 20, 21, 22, 23, 24, 25} and $\alpha_1$=3, $\alpha_2$=2 and $\alpha_3$=0, (v) $\Delta f_{RA}$=240 KHz, $\Delta f$=240 KHz, $L_{RA}$=571, $$N_{RB}^{RA} = 48,$$

and $\bar{k}$ being a value from {0, 1, 2, 3, 4, 51}, or (vi) $\Delta f_{RA}$=240 KHz, $\Delta f$=240 KHz, $L_{RA}$=1151, $$N_{RB}^{RA} = 96,$$

and $\bar{k}$ being a value from {0, 1}.

In some embodiments, the wireless communication device may allocate the resource blocks to the RA preamble according to (i) $f_{RA}$=240 KHz, $\Delta f$=480 KHz, $L_{RA}$=139, $$N_{RB}^{RA} = 6,$$

and $\bar{k}$ being a value from {0, 1, 2, 3, 4, 51}, (ii) $\Delta f_{RA}$=240 KHz, $\Delta f$=480 KHz, $L_{RA}$=283, $$N_{RB}^{RA} = 12,$$

and $\bar{k}$ being a value from {0, 1, 2, 3, 4, 51}, (iii) $f_{RA}$=240 KHz, $\Delta f$=480 KHz, $L_{RA}$=839, $$N_{RB}^{RA} = 35,$$

and $\bar{k}$ being a value from {0, 1}, (iv) $\Delta f_{RA}$=240 KHz, $\Delta f$=480 KHz, $L_{RA}$=839, $$N_{RB}^{RA} = 36,$$

$\bar{k}$ being a value from {0, 1, 2, 3, 4, 5, 6, 7, 8, 9, 10, 11, 12, 13, 14, 15, 16, 17, 18, 19, 20, 21, 22, 23, 24, 25} and $\alpha_1$=2, $\alpha_2$=2 and $\alpha_3$=0, (v) $\Delta f_{RA}$=240 KHz, $\Delta f$=480 KHz, $L_{RA}$=571, $$N_{RB}^{RA} = 24,$$

and $\bar{k}$ being a value from {0, 1, 2, 3, 4, 5}, or (vi) $f_{RA}$=240 KHz, $\Delta f$=480 KHz, $L_{RA}$=1151, $$N_{RB}^{RA} = 48,$$

and $\bar{k}$ being a value from {0, 1}.

In some embodiments, the wireless communication device may allocate the resource blocks to the RA preamble according to (i) $f_{RA}$=240 KHz, $\Delta f$=960 KHz, $L_{RA}$=139, $$N_{RB}^{RA} = 3,$$

and $\bar{k}$ being a value from {0, 1, 2, 3, 4, 51}, (ii) $\Delta f_{RA}$=240 KHz, $\Delta f$=960 KHz, $L_{RA}$=283, $$N_{RB}^{RA} = 6,$$

and $\bar{k}$ being a value from {0, 1, 2, 3, 4, 51}, (iii) $f_{RA}$=240 KHz, $\Delta f$=960 KHz, $L_{RA}$=839, $$N_{RB}^{RA} = 18,$$

and $\bar{k}$ being a value from {0, 1, 2, 3, 4, 5, 6, 7, 8, 9, 10, 11, 12, 13, 14, 15, 16, 17, 18, 19, 20, 21, 22, 23, 24, 25}, (iv) $\Delta f_{RA}$=240 KHz, $\Delta f$=960 KHz, $L_{RA}$=571, $$N_{RB}^{RA} = 12,$$

and $\bar{k}$ being a value from {0, 1, 2, 3, 4, 5}, or (v) $\Delta f_{RA}$=240 KHz, $\Delta f$=960 KHz, $L_{RA}$=1151, $$N_{RB}^{RA} = 24,$$

and $\bar{k}$ being a value from {0, 1}.

In some embodiments, the wireless communication device may allocate the resource blocks to the RA preamble according to (i) $\Delta f_{RA}$=480 KHz, $\Delta f$=120 KHz, $L_{RA}$=139, $$N_{RB}^{RA} = 47,$$

and $\bar{k}$ being a value from {0, 1, 2}, (ii) $\Delta f_{RA}$=480 KHz, $\Delta f$=120 KHz, $L_{RA}$=139, $$N_{RB}^{RA} = 48,$$

$\bar{k}$ being a value from {0, 1, 2, 3, 4, 5} and $\alpha_1$=4, $\alpha_2$=1 and $\alpha_3$=0, (iii) $\Delta f_{RA}$=480 KHz, $\Delta f$=120 KHz, $L_{RA}$=283, $$N_{RB}^{RA} = 95,$$

and $\bar{k}$ being a value from {0, 1, 2}, (iv) $\Delta f_{RA}$=480 KHz, $\Delta f$=120 KHz, $L_{RA}$=283, $$N_{RB}^{RA} = 96,$$

$\bar{k}$ being a value from {0, 1, 2, 3, 4, 5} and $\alpha_1$=5, $\alpha_2$=1 and $\alpha_3$=0, (v) $\Delta f_{RA}$=480 KHz, $\Delta f$=120 KHz, $L_{RA}$=839, $$N_{RB}^{RA} = 280,$$

and $\bar{k}$ being a value from {0, 1}, (vi) $\Delta f_A$=480 KHz, $\Delta f$=120 KHz, $L_{RA}$=839, $$N_{RB}^{RA} = 288,$$

$\bar{k}$ being a value from {0, 1, 2, 3, 4, 5, 6, 7, 8, 9, 10, 11, 12, 13, 14, 15, 16, 17, 18, 19, 20, 21, 22, 23, 24, 25} and $\alpha_1$=5, $\alpha_2$=2 and $\alpha_3$=0, (vii) $\Delta f_{RA}$=480 KHz, $\Delta f$=120 KHz, $L_{RA}$=571, $$N_{RB}^{RA} = 191,$$

and $\bar{k}$ being a value from {0, 1, 2}, (viii) $\Delta f_{RA}$=480 KHz, $\Delta f$=120 KHz, $L_{RA}$=571, $$N_{RB}^{RA} = 192,$$

$\bar{k}$ being a value from {0, 1, 2, 3, 4, 5} and $\alpha_1$=6, $\alpha_2$=1 and $\alpha_3$=0, or (ix) $f_{RA}$=480 KHz, $\Delta f$=120 KHz, $L_{RA}$=1151, $$N_{RB}^{RA} = 384,$$

and $\bar{k}$ being a value from {0, 1}.

In some embodiments, the wireless communication device may allocate the resource blocks to the RA preamble according to (i) $f_{RA}$=480 KHz, $\Delta f$=240 KHz, $L_{RA}$=139, $$N_{RB}^{RA} = 24,$$

and $\bar{k}$ being a value from {0, 1, 2, 3, 4, 5}, (ii) $f_{RA}$=480 KHz, $\Delta f$=240 KHz, $L_{RA}$=283, $$N_{RB}^{RA} = 48,$$

and $\bar{k}$ being a value from {0, 1, 2, 3, 4, 51}, (iii) $f_{RA}$=480 KHz, $\Delta f$=240 KHz, $L_{RA}$=839, $$N_{RB}^{RA} = 140,$$

and $\bar{k}$ being a value from {0, 1}, (iv) $f_{RA}$=480 KHz, $\Delta f$=240 KHz, $L_{RA}$=839, $$N_{RB}^{RA} = 144,$$

$\bar{k}$ being a value from {0, 1, 2, 3, 4, 5, 6, 7, 8, 9, 10, 11, 12, 13, 14, 15, 16, 17, 18, 19, 20, 21, 22, 23, 24, 25} and $\alpha_1$=4, $\alpha_2$=2 and $\alpha_3$=0, (v) $\Delta f_{RA}$=480 KHz, $\Delta f$=240 KHz, $L_{RA}$=571, $$N_{RB}^{RA} = 96,$$

and $\bar{k}$ being a value from {0, 1, 2, 3, 4, 5}, or (vi) $f_{RA}$=480 KHz, $\Delta f$=240 KHz, $L_{RA}$=1151, $$N_{RB}^{RA} = 192,$$

and $\bar{k}$ being a value from {0, 1}.

In some embodiments, the wireless communication device may allocate the resource blocks to the RA preamble according to (i) $f_{RA}$=480 KHz, $\Delta f$=480 KHz, $L_{RA}$=139, $$N_{RB}^{RA} = 12,$$

and $\bar{k}$ being a value from {0, 1, 2, 3, 4, 5}, (ii) $f_{RA}$=480 KHz, $\Delta f$=480 KHz, $L_{RA}$=283, $$N_{RB}^{RA} = 24,$$

and $\bar{k}$ being a value from {0, 1, 2, 3, 4, 5}, (iii) $\Delta f_{RA}$=480 KHz, $\Delta f$=480 KHz, $L_{RA}$=839, $$N_{RB}^{RA} = 70,$$

and $\bar{k}$ being a value from {0, 1}, (iv) $\Delta f_{RA}$=480 KHz, $\Delta f$=480 KHz, $L_{RA}$=839, $$N_{RB}^{RA} = 72,$$

$\bar{k}$ being a value from {0, 1, 2, 3, 4, 5, 6, 7, 8, 9, 10, 11, 12, 13, 14, 15, 16, 17, 18, 19, 20, 21, 22, 23, 24, 25} and $\alpha_1$=3, $\alpha_2$=2 and $\alpha_3$=0, (v) $\Delta f_{RA}$=480 KHz, $\Delta f$=480 KHz, $L_{RA}$=571, $$N_{RB}^{RA} = 48,$$

and $\bar{k}$ being a value from {0, 1, 2, 3, 4, 51}, or (vi) $\Delta f_{RA}$=480 KHz, $\Delta f$=480 KHz, $L_{RA}$=1151, $$N_{RB}^{RA} = 96,$$

and $\bar{k}$ being a value from {0, 1}.

In some embodiments, the wireless communication device may allocate the resource blocks to the RA preamble according to (i) $f_{RA}$=480 KHz, $\Delta f$=960 KHz, $L_{RA}$=139, $$N_{RB}^{RA} = 6,$$

and $\bar{k}$ being a value from {0, 1, 2, 3, 4, 5}, (ii) $\Delta f_{RA}$=480 KHz, $\Delta f$=960 KHz, $L_{RA}$=283, $$N_{RB}^{RA} = 12,$$

and $\bar{k}$ being a value from {0, 1, 2, 3, 4, 5}, (iii) $f_{RA}$=480 KHz, $\Delta f$=960 KHz, $L_{RA}$=839, $$N_{RB}^{RA} = 35,$$

and $\bar{k}$ being a value from {0, 1}, (iv) $\Delta f_{RA}$=480 KHz, $\Delta f$=960 KHz, $L_{RA}$=839, $$N_{RB}^{RA} = 36,$$

$\bar{k}$ being a value from {0, 1, 2, 3, 4, 5, 6, 7, 8, 9, 10, 11, 12, 13, 14, 15, 16, 17, 18, 19, 20, 21, 22, 23, 24, 25} and $\alpha_1$=2, $\alpha_2$=2 and $\alpha_3$=0, (v) $\Delta f_{RA}$=480 KHz, $\Delta f$=960 KHz, $L_{RA}$=571, $$N_{RB}^{RA} = 24,$$

and $\bar{k}$ being a value from {0, 1, 2, 3, 4, 5}, or (vi) $\Delta f_{RA}$=480 KHz, $\Delta f$=960 KHz, $L_{RA}$=1151, $$N_{RB}^{RA} = 48,$$

and $\bar{k}$ being a value from {0, 1}.

In some embodiments, the wireless communication device may allocate the resource blocks to the RA preamble according to (i) $\Delta f_{RA}$=960 KHz, $\Delta f$=120 KHz, $L_{RA}$=139, $$N_{RB}^{RA} = 93,$$

and
$\bar{k}$ being a value from {0, 1}, (ii) $f_{RA}$=960 KHz, $\Delta f$=120 KHz, $L_{RA}$=139, $$N_{RB}^{RA} = 96,$$

$\bar{k}$ being a value from {0, 1, 2, 3, 4, 5} and $\alpha 1=5$, $\alpha_2=1$ and $\alpha_3=0$, (iii) $f_{RA}$=960 KHz, $\Delta f$=120 KHz, $L_{RA}$=283, $$N_{RB}^{RA} = 189,$$

and $\bar{k}$ being a value from {0, 1}, (vi) $f_{RA}$=960 KHz, $\Delta f$=120 KHz, $L_{RA}$=283, $$N_{RB}^{RA} = 192,$$

$\bar{k}$ being a value from {0, 1, 2, 3, 4, 5} and $\alpha_1=6$, $\alpha_2=1$ and $\alpha_3=0$, (v) $\Delta f_{RA}$=960 KHz, $\Delta f$=120 KHz, $L_{RA}$=839, $$N_{RB}^{RA} = 560,$$

and $\bar{k}$ being a value from {0, 1}, (vi) $f_{RA}$=960 KHz, $\Delta f$=120 KHz, $L_{RA}$=839, $$N_{RB}^{RA} = 576,$$

$\bar{k}$ being a value from {0, 1, 2, 3, 4, 5, 6, 7, 8, 9, 10, 11, 12, 13, 14, 15, 16, 17, 18, 19, 20, 21, 22, 23, 24, 25} and $\alpha_1=6$, $\alpha_2=2$ and $\alpha_3=0$, (vii) $\Delta f_{RA}$=960 KHz, $\Delta f$=120 KHz, $L_{RA}$=571, $$N_{RB}^{RA} = 381,$$

and $\bar{k}$ being a value from {0, 1}, (viii) $\Delta f_{RA}$=960 KHz, $\Delta f$=120 KHz, $L_{RA}$=571, $$N_{RB}^{RA} = 384,$$

$\bar{k}$ being a value from {0, 1, 2, 3, 4, 5} and $\alpha_1=7$, $\alpha_2=1$ and $\alpha_3=0$, or (ix) $f_{RA}$=960 KHz, $\Delta f$=120 KHz, $L_{RA}$=1151, $$N_{RB}^{RA} = 768,$$

and $\bar{k}$ being a value from {0, 1}.

In some embodiments, the wireless communication device may allocate the resource blocks to the RA preamble according to (i) $\Delta f_{RA}$=960 KHz, $\Delta f$=240 KHz, $L_{RA}$=139, $$N_{RB}^{RA} = 47,$$

and $\bar{k}$ being a value from {0, 1, 2}, (ii) $\Delta f_{RA}$=960 KHz, $\Delta f$=240 KHz, $L_{RA}$=139, $$N_{RB}^{RA} = 48,$$

$\bar{k}$ being a value from {0, 1, 2, 3, 4, 5} and $\alpha_1=4$, $\alpha_2=1$ and $\alpha_3=0$, (iii) $\Delta f_{RA}$=960 KHz, $\Delta f$=240 KHz, $L_{RA}$=283, $$N_{RB}^{RA} = 95,$$

and $\bar{k}$ being a value from {0, 1, 2}, (iv) $\Delta f_{RA}$=960 KHz, $\Delta f$=240 KHz, $L_{RA}$=283, $$N_{RB}^{RA} = 96,$$

$\bar{k}$ being a value from {0, 1, 2, 3, 4, 5}, and $\alpha_1=3$, $\alpha_2=2$ and $\alpha_3=0$, (v) $\Delta f_{RA}$=960 KHz, f=240 KHz, $L_{RA}$=839, $$N_{RB}^{RA} = 280,$$

and $\bar{k}$ being a value from {0, 1}, (vi) $\Delta f_{RA}$=960 KHz, $\Delta f$=240 KHz, $L_{RA}$=839, $$N_{RB}^{RA} = 288,$$

{0, 1, 2, 3, 4, 5, 6, 7, 8, 9, 10, 11, 12, 13, 14, 15, 16, 17, 18, 19, 20, 21, 22, 23, 24, 25} and $\alpha_1=5$, $\alpha_2=2$ and $\alpha_3=0$, (vii) $\Delta f_{RA}$=960 KHz, $\Delta f$=240 KHz, $L_{RA}$=571, $$N_{RB}^{RA} = 191,$$

and $\bar{k}$ being a value from {0, 1, 2}, (viii) $\Delta f_{RA}$=960 KHz, $\Delta f$=240 KHz, $L_{RA}$=571, $$N_{RB}^{RA} = 192,$$

$\bar{k}$ being a value from {0, 1, 2, 3, 4, 5} and $\alpha_1=6$, $\alpha_2=1$ and $\alpha_3=0$, or (ix) $f_{RA}$=960 KHz, $\Delta f$=240 KHz, $L_{RA}$=1151, $$N_{RB}^{RA} = 384,$$

and $\bar{k}$ being a value from {0, 1}.

In some embodiments, the wireless communication device may allocate the resource blocks to the RA preamble according to (i) $f_{RA}$=960 KHz, Δf=480 KHz, $L_{RA}$=139, $$N_{RB}^{RA} = 24,$$

and $\overline{k}$ being a value from {0, 1, 2, 3, 4, 51}, (ii) $f_{RA}$=960 KHz, Δf=480 KHz, $L_{RA}$=283, $$N_{RB}^{RA} = 48,$$

and $\overline{k}$ being a value from {0, 1, 2, 3, 4, 5} (iii) Δ$f_{RA}$=960 KHz, Δf=480 KHz, $L_{RA}$=839, $$N_{RB}^{RA} = 140,$$

and $\overline{k}$ being a value from {0, 1}, (iv) $f_{RA}$=960 KHz, Δf=480 KHz, $L_{RA}$=839, $$N_{RB}^{RA} = 144,$$

$\overline{k}$ being a value from 0, 1, 2, 3, 4, 5, 6, 7, 8, 9, 10, 11, 12, 13, 14, 15, 16, 17, 18, 19, 20, 21, 22, 23, 24, 25} and $α_1$=4, $α_2$=2 and $α_3$=0, (v) Δ$f_{RA}$=960 KHz, Δf=480 KHz, $L_{RA}$=571, $$N_{RB}^{RA} = 96,$$

and $\overline{k}$ being a value from {0, 1, 2, 3, 4, 51}, or (vi) Δ$f_{RA}$=960 KHz, Δf=480 KHz, $L_{RA}$-=115, $$N_{RB}^{RA} = 192,$$

and $\overline{k}$ being a value from {0, 1}.

In some embodiments, the wireless communication device may allocate the resource blocks to the RA preamble according to (i) $f_{RA}$=960 KHz, Δf=960 KHz, $L_{RA}$=139, $$N_{RB}^{RA} = 12,$$

and $\overline{k}$ being a value from {0, 1, 2, 3, 4, 5}, (ii) $f_{RA}$=960 KHz, Δf=960 KHz, $L_{RA}$=283, $$N_{RB}^{RA} = 24,$$

and $\overline{k}$ being a value from {0, 1, 2, 3, 4, 5}(iii) Δ$f_{RA}$=960 KHz, Δf=960 KHz, $L_{RA}$=839, $$N_{RB}^{RA} = 70,$$

and $\overline{k}$ being a value from {0, 1}, (iv) $f_{RA}$=960 KHz, Δf=960 KHz, $L_{RA}$=839, $$N_{RB}^{RA} = 72,$$

$\overline{k}$ being a value from 0, 1, 2, 3, 4, 5, 6, 7, 8, 9, 10, 11, 12, 13, 14, 15, 16, 17, 18, 19, 20, 21, 22, 23, 24, 25} and $α_1$=3, $α_2$=2 and $α_3$=0, (v) Δ$f_{RA}$=960 KHz, Δf=960 KHz, $L_{RA}$=571, $$N_{RB}^{RA} = 48,$$

and $\overline{k}$ being a value from {0, 1, 2, 3, 4, 51}, or (vi) Δ$f_{RA}$=960 KHz, Δf=960 KHz, $L_{RA}$=1151, $$N_{RB}^{RA} = 96,$$

and $\overline{k}$ being a value from {0, 1}.

The wireless communication device may transmit the RA preamble according to allocated resource blocks. The length of the RA preamble $L_{RA}$ may have a value of 139, 283, 571, 839 or 1151. The subcarrier spacing for the PUSCH Δf may have a value of 120 KHz, 240 KHz, 480 KHz, 960 KHz or 960*N KHz, wherein N is a positive integer. The subcarrier spacing for the RA preamble Δ$f_{RA}$ may have a value of 120 KHz, 240 KHz, 480 KHz, 960 KHz or 960*N KHz, wherein N is a positive integer. The number of resource elements in one resource block M may have a value of 12.

At least one aspect is directed to a system, method, apparatus, or a computer-readable medium. A wireless communication node may receive, from a wireless communication device, a random access (RA) preamble according to resource blocks allocated according to a number of resource blocks to be occupied by a random access preamble $$\left(N_{RB}^{RA}\right),$$

and a physical random access channel (PRACH) frequency position parameter ($\overline{k}$). The number of resource blocks to be occupied by a random access preamble $$N_{RB}^{\prime RA}$$

may satisfy at least one of $$N_{RB}^{RA} = \text{ceil}\left((L_{RA} \cdot \Delta f_{RA})/(\Delta f \cdot M)\right) \text{ or } N_{RB}^{RA} \leq N_{RB}^{\prime RA} = 2^{α_1} \cdot 3^{α_2} \cdot 5^{α_3},$$

where $$N_{RB}^{\prime RA}$$

represents a bandwidth of the random-access (RA) preamble in terms of resource blocks, and each of $α_1$, $α_2$ and $α_3$ is a non-negative integer. The PRACH frequency position parameter $\bar{k}$ may be one value from a set of non-negative integer values. A largest value in the set may be $$\text{ceil}\left((M \cdot N_{RB}^{RA} \cdot \Delta f - L_{RA} \cdot \Delta f_{RA})/\Delta f_{RA}\right),$$

where $L_{RA}$ is a length of the RA preamble in terms of resource elements, $\Delta f$ is a subcarrier spacing for a physical uplink shared channel (PUSCH), $f_{RA}$ is a subcarrier spacing for the RA preamble, and M is a number of resource elements in one resource block.

Embodiments described herein provide solutions for the technical problem of establishing or confirming the combination of PUSCH subcarrier spacing and PRACH subcarrier spacing. Specifically, new rules for allocating resource blocks to the RA preamble are described, where the subcarrier spacing for PUSCH $\Delta f$ and/or the subcarrier spacing for the RA preamble $\Delta f_{RA}$ may exceed 120 KHz.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

DETAILED DESCRIPTION

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

1. Mobile Communication Technology and Environment

Figure 1:
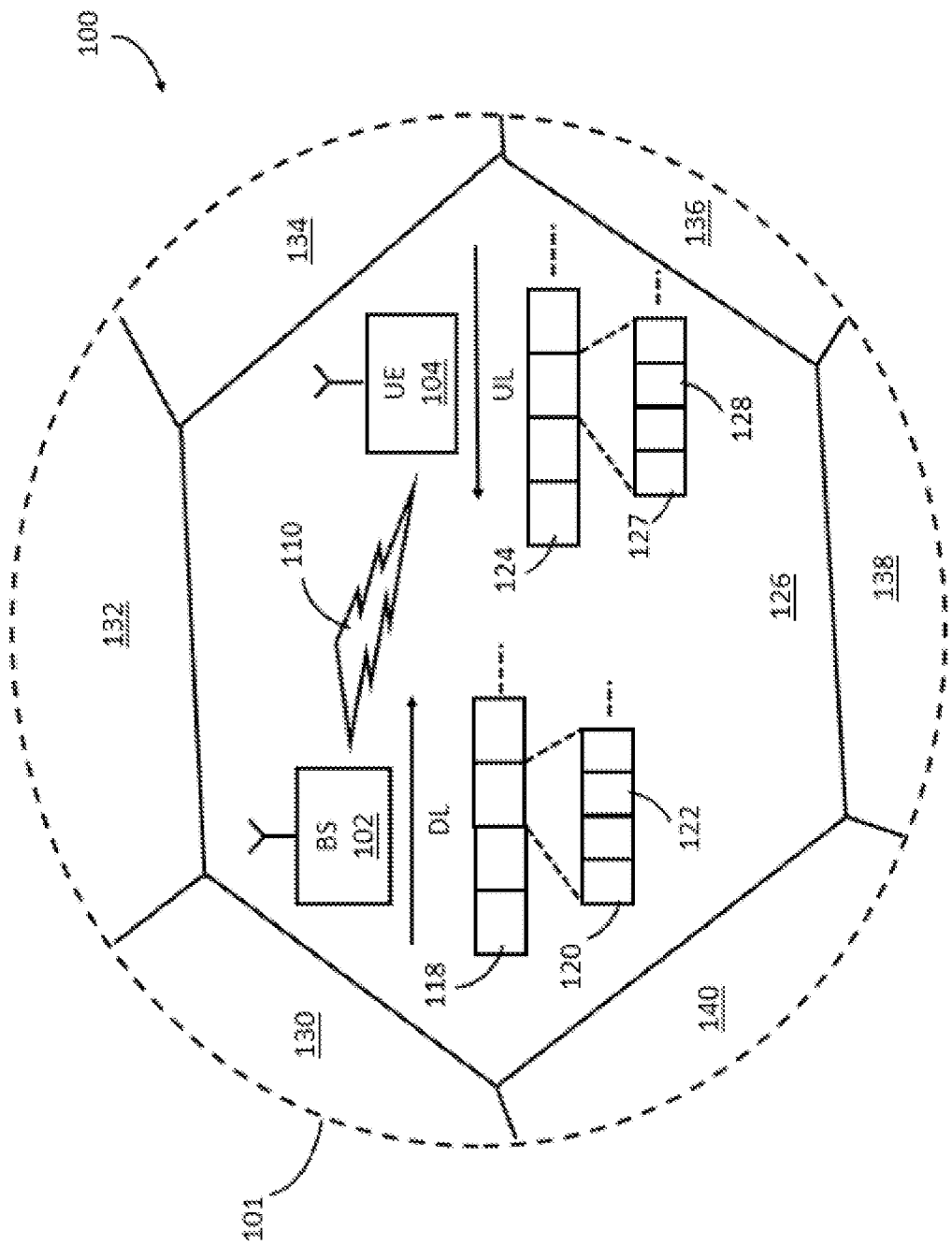
FIG. 1 illustrates an example cellular communication network in which techniques disclosed herein may be implemented, in accordance with an embodiment of the present disclosure.

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102"; also referred to as wireless communication node) and a user equipment device 104 (hereinafter "UE 104"; also referred to as wireless communication device) that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127, which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
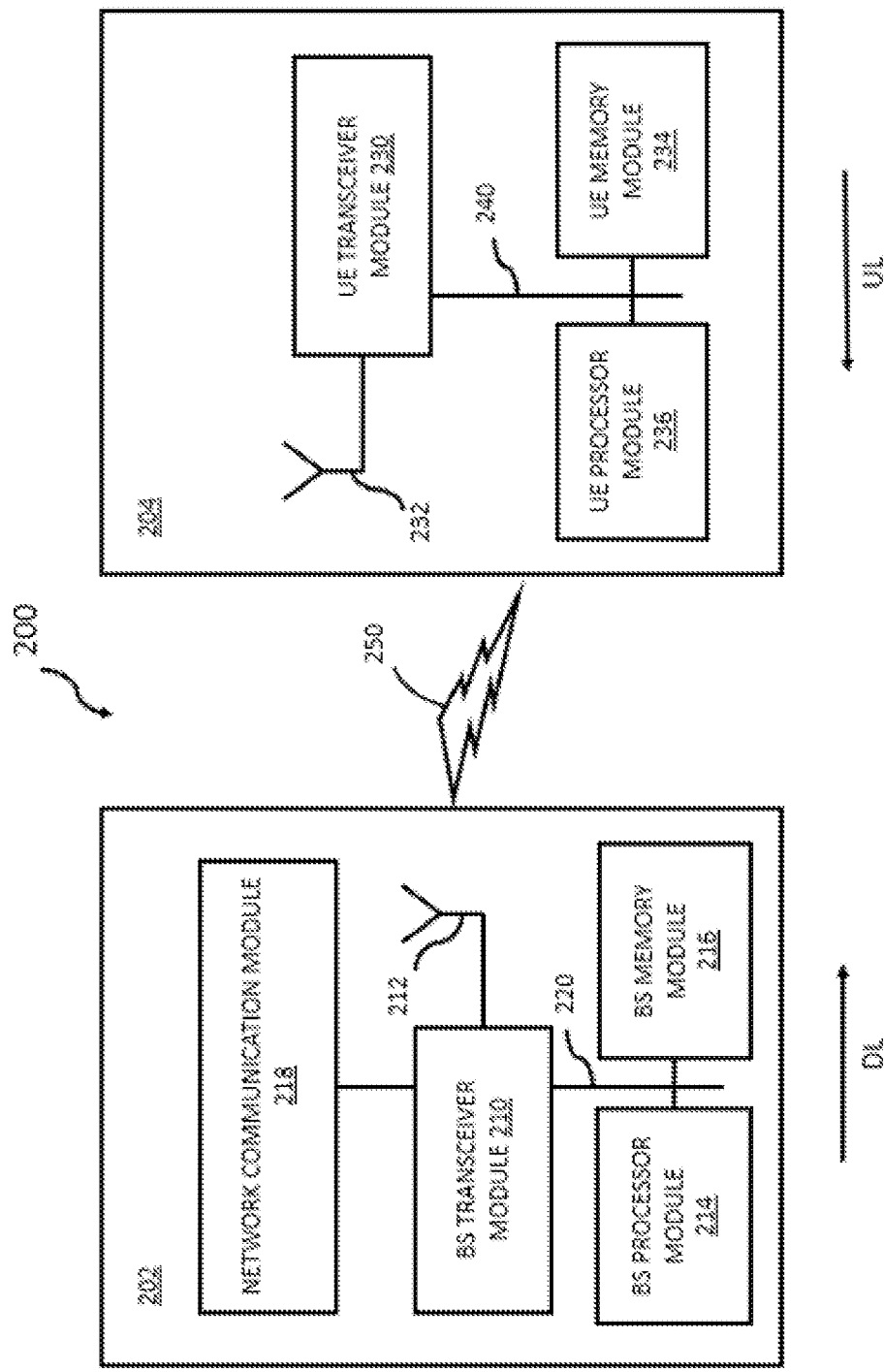
FIG. 2 illustrates a block diagram of an example base station and a user equipment device, in accordance with some embodiments of the present disclosure.

FIG. 2 illustrates a block diagram of an example wireless communication system 200 for transmitting and receiving wireless communication signals (e.g., OFDM/OFDMA signals) in accordance with some embodiments of the present solution. The system 200 may include components and elements configured to support known or conventional operating features that need not be described in detail herein. In one illustrative embodiment, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure In accordance with some embodiments, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 may be coordinated in time such that the uplink receiver circuitry is coupled to the uplink antenna 232 for reception of transmissions over the wireless transmission link 250 at the same time that the downlink transmitter is coupled to the downlink antenna 212. Conversely, the operations of the two transceivers 210 and 230 may be coordinated in time such that the downlink receiver is coupled to the downlink antenna 212 for reception of transmissions over the wireless transmission link 250 at the same time that the uplink transmitter is coupled to the uplink antenna 232. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

The Open Systems Interconnection (OSI) Model (referred to herein as, "open system interconnection model") is a conceptual and logical layout that defines network communication used by systems (e.g., wireless communication device, wireless communication node) open to interconnection and communication with other systems. The model is broken into seven subcomponents, or layers, each of which represents a conceptual collection of services provided to the layers above and below it. The OSI Model also defines a logical network and effectively describes computer packet transfer by using different layer protocols. The OSI Model may also be referred to as the seven-layer OSI Model or the seven-layer model. In some embodiments, a first layer may be a physical layer. In some embodiments, a second layer may be a Medium Access Control (MAC) layer. In some embodiments, a third layer may be a Radio Link Control (RLC) layer. In some embodiments, a fourth layer may be a Packet Data Convergence Protocol (PDCP) layer. In some embodiments, a fifth layer may be a Radio Resource Control (RRC) layer. In some embodiments, a sixth layer may be a Non Access Stratum (NAS) layer or an Internet Protocol (IP) layer, and the seventh layer being the other layer.

2. Systems and Methods for Combinations of PUSCH Subcarrier Spacing and PRACH Subcarrier Spacing For high frequency communications, the channel bandwidth is usually wider than that in $5^{th}$ Generation (5G) new radio (NR). As such, new subcarrier spacing may be introduced. For instance, the 3GPP RAN 86 specification defines a new item of "NR above 52.6 GHz." The main scope of this item is numerology, channel access for RAN1 and RAN2, which may lead to introducing new subcarrier spacing. The introduction of new subcarrier spacing raises the issue of how to establish or confirm the combination of physical uplink shared channel (PUSCH) subcarrier spacing and physical random access channel (PRACH) subcarrier spacing. For example, if a new PRACH subcarrier spacing is introduced, the current disclosure describes new rules the rules for establishing or confirming combinations of PUSCH subcarrier spacing and PRACH subcarrier spacing. The new rules allow for combinations of PUSCH subcarrier spacing and PRACH subcarrier spacing that are not upper bounded by 120 KHz. Either the PUSCH subcarrier spacing or the PRACH subcarrier spacing or both may exceed 120 KHz, according to the new rules described herein.

Figure 3:
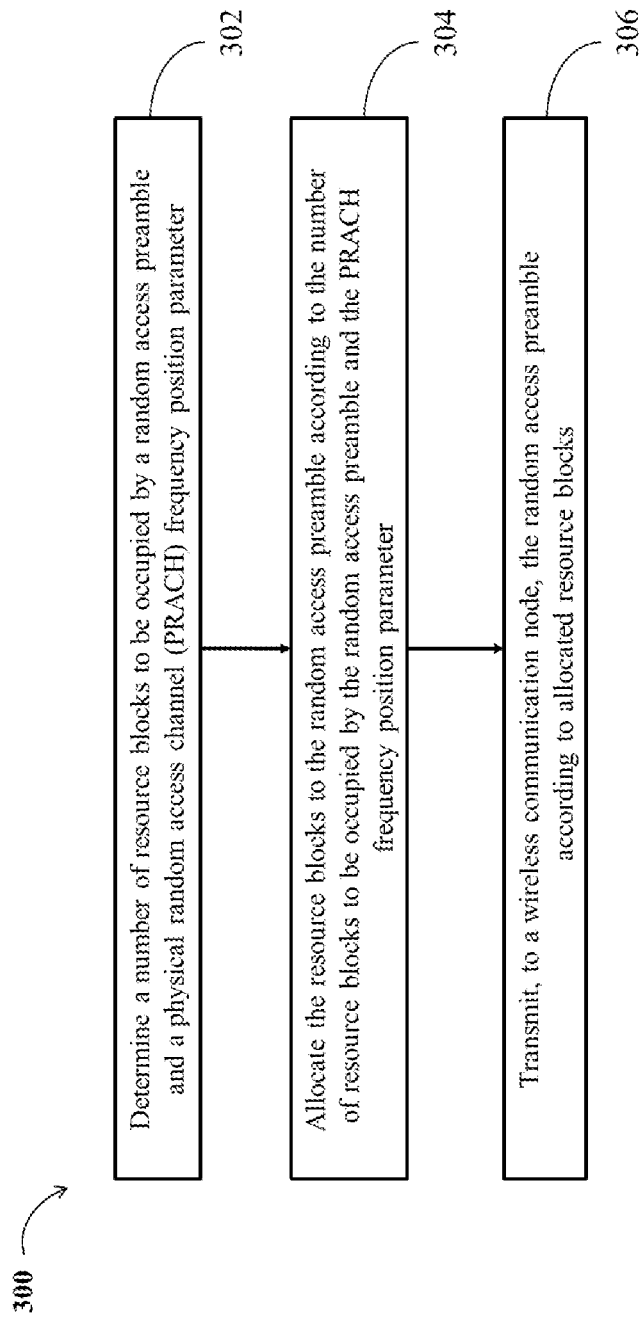
FIG. 3 shows a flowchart illustrating a method for wireless communication performed by a wireless communication device, in accordance with some embodiments of the present disclosure.

Referring to FIG. 3, a flowchart illustrating a method 300 for wireless communication performed by a wireless communication device is shown, in accordance with some embodiments of the present disclosure. The method 300 can include the wireless communication device 104 or 204 determining a number of resource blocks to be occupied by a random access (RA) preamble $$(N_{RB}^{RA}),$$

and a physical random access channel (PRACH) frequency position parameter ($\bar{k}$) (STEP 302). The PRACH frequency position parameter represents k and a PUSCH subcarrier spacing represents a frequency offset between a RA preamble to the middle of nearest PUSCH subcarrier. The PRACH frequency position parameter $\bar{k}$ may be expressed in terms of RA preamble subcarrier spacing. The subcarrier spacing for the RA preamble is referred to herein as $\Delta f_{RA}$, and the parameter $\bar{k}$ may expressed as a number of $\Delta f_{RA}$ units. The parameter $N_{RB}^{RA}$ represents the total number of occupied resource blocks, which includes the $\bar{k}$ resource blocks associated with the frequency offset as well as the resource blocks used (or to be used) by the RA preamble(s).

The method 300 can include the wireless communication device 104 or 204 allocating the resource blocks to the (RA) preamble according to $$N_{RB}^{RA}$$

and $\bar{k}$ (STEP 304). The wireless communication device 104 or 204 may allocate the resource blocks (RBs) in a way such that the number of resource blocks to be occupied by the RA preamble $$N_{RB}^{RA}$$

satisfies at least one of $$N_{RB}^{RA} = \text{ceil}((L_{RA} \cdot \Delta f_{RA})/(\Delta f \cdot M)) \text{ or } N_{RB}^{RA} \leq N_{RB}'^{RA} = 2^{\alpha_1} \cdot 3^{\alpha_2} \cdot 5^{\alpha_3}.$$

The upper bound $$N_{RB}'^{RA}$$

represents a bandwidth of the RA preamble in terms of resource blocks. Each of the parameters $\alpha_1$, $\alpha_2$ and $\alpha_3$ can be a non-negative integer. The PRACH frequency position parameter $\bar{k}$ may be one value from a set of non-negative integer values, where a largest value in the set of non-negative integer values may be $$\text{ceil}((M \cdot N_{RB}^{RA} \cdot \Delta f - L_{RA} \cdot \Delta f_{RA})/\Delta f_{RA}).$$

Specifically, the PRACH frequency offset or frequency position $\bar{k}$ can be one of the integer values in the set $$\{0, 1, 2, 3, \ldots, \text{ceil}(M \cdot N_{RB}^{RA} \cdot \Delta f - L_{RA} \cdot \Delta f_{RA})/\Delta f_{RA})\}.$$

The parameter $L_{RA}$ represents a length of the RA preamble in terms of resource elements (e.g., in terms of RA preamble subcarriers), and the parameter $\Delta f$ represents a subcarrier spacing for PUSCH. The parameters M represents the number of resource elements (e.g., PUSCH subcarriers) in one resource block.

Figure 4:
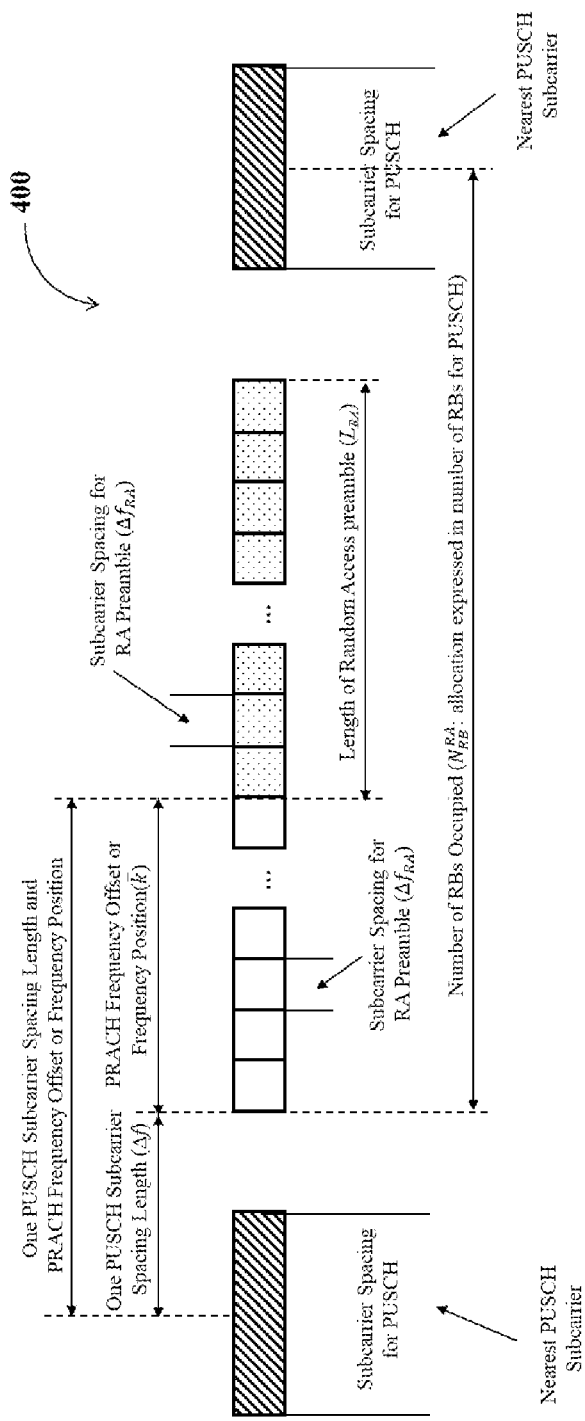
FIG. 4 shows a diagram illustrating an example arrangement of resource elements and various parameters involved in the allocation of resource blocks, in accordance with some embodiments of the present disclosure.

Referring to FIG. 4, a diagram 400 illustrating an example arrangement of resource elements and various parameters involved in the allocation of resource blocks is shown, in accordance with some embodiments of the present disclosure. Each of the striped rectangles represents on both sides represents a subcarrier spacing for PUSCH, and each of the squares in the middle represents a subcarrier spacing for the RA preamble. The dotted squares represent subcarriers carrying RA preamble, while white squares represent subcarriers that do not carry RA preamble. The length of each subcarrier spacing for PUSCH is denoted as $\Delta f$, while the length of each subcarrier spacing for the RA preamble is denoted as $\Delta f_{RA}$. Both $\Delta f$ and $\Delta f_{RA}$ may be expressed in Hz. The PRACH frequency position parameter $\bar{k}$ represents the number of RA preamble subcarriers (e.g., white squares) and the length of the PUSCH subcarrier spacing Δf can represent the frequency difference separating the start of the RA preamble from the middle of nearest PUSCH subcarrier spacing. The length of the RA preamble $L_{RA}$ represents the number of dotted squares forming the RA preamble. The parameter $L_{RA}$ can be expressed as a number of RA preamble subcarriers forming the RA preamble. The parameter $$N_{RB}^{RA}$$

is shown to represent the number of RBs occupied, which includes RBs associated with frequency offset $\bar{k}$ as well as RBs associated with $L_{RA}$.

The wireless communication device 104 or 204 may use the frequency offset $\bar{k}$ and a PUSCH subcarrier spacing to determine the start of the RA preamble from the middle of the nearest PUSCH subcarrier to be allocated to the RA preamble. The wireless communication device 104 or 204 may use the parameter $$N_{RB}^{RA}$$

and the frequency offset $\bar{k}$ to determine the number of RBs to be allocated to the RA preamble. In some implementations, the wireless communication device 104 or 204 may allocate the RBs to the RA preamble according to $$N_{RB}^{RA}$$

and $\bar{k}$ and according to at least one of $L_{RA}$, Δf or Δ$f_{RA}$. The wireless communication device 104 or 204 may use the parameter $$N_{RB}^{RA},$$

the frequency offset $\bar{k}$ and $L_{RA}$, Δf or Δ$f_{RA}$ to determine the number of RBs to be allocated to the RA preamble, for example, as $$\text{floor}((M \cdot N_{RB}^{RA} \cdot \Delta f - \bar{k} \cdot \Delta f_{RA})/(M \cdot \Delta f)).$$

By determining the number of RBs to be allocated to the RA preamble, the wireless communication device 104 or 204 determined each RB to be allocated to the RA preamble.

In some implementations, the length of the RA preamble $L_{RA}$ may have a value of 139, 283, 571, 839 or 1151. The subcarrier spacing for the PUSCH Δf may have a value of 120 KHz, 240 KHz, 480 KHz, 960 KHz or 960*N KHz, wherein N is a positive integer. The subcarrier spacing for the RA preamble Δ$f_{RA}$ may have a value of 120 KHz, 240 KHz, 480 KHz, 960 KHz or 960*N KHz, wherein N is a positive integer. The number of resource elements in one resource block M may have a value of 12. The wireless communication device 104 or 204 may use different combinations of these parameters as discussed in further with regard to the various scenarios or cases discussed below.

Referring back to FIG. 3, the method 300 may further include the wireless communication device 104 or 204 transmitting, to the wireless communication node 102 or 202, the RA preamble according to the allocated resource blocks (STEP 306). The wireless communication device 104 or 204 may transmit RA preamble in the RBs allocated to the RA preamble.

Figure 5:
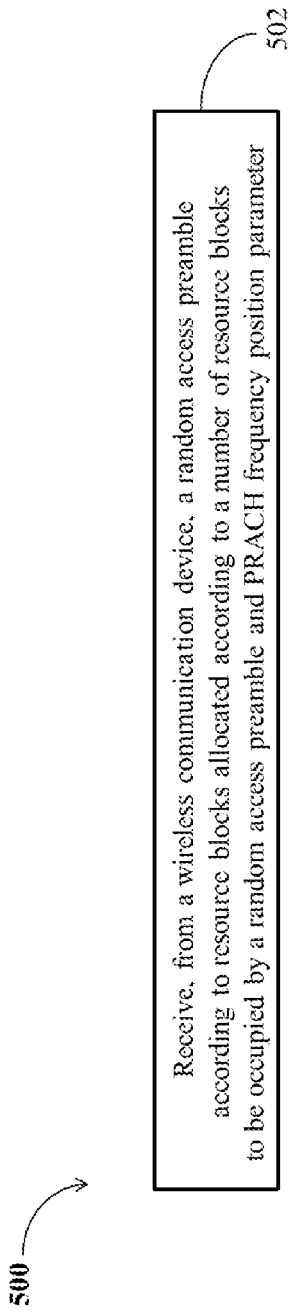
FIG. 5 shows a flowchart illustrating a method for wireless communication performed by a wireless communication node, in accordance with some embodiments of the present disclosure.

Referring to FIG. 5, a flowchart illustrating a method 500 for wireless communication performed by a wireless communication node 102 or 202 is shown, in accordance with some embodiments of the present disclosure. The method 500 may include the wireless communication node 102 or 202 receiving, from the wireless communication device 104 or 204, a RA preamble according to resource blocks allocated according to a number of resource blocks to be occupied by the RA preamble $$N_{RB}^{RA}$$

and PRACH frequency position parameter $\bar{k}$. Specifically, the wireless communication node 102 or 202 may receive the RA preamble in resource blocks allocated according to $$N_{RB}^{RA}$$

and $\bar{k}$ as discussed above with regard to FIGS. 3 and 4.

Case 1:

According to a first case or scenario, the subcarrier spacing for RA preamble(s) may be equal to 120 KHz, and the subcarrier spacing for PUSCH may be equal to 120 KHz. In a first implementation of Case 1, the wireless communication device 104 or 204 may select or determine the length of the RA preamble to be $L_{RA}$=139. In some implementations, the wireless communication node 102 or 202 may configure at least one of the length of the RA preamble $L_{RA}$, the RA frequency resource, the RA time resource, the length of the PUSCH subcarrier spacing Δf or the RA subcarrier spacing Δ$f_{RA}$ and signal the configured parameter(s) to the wireless communication device 104 or 204. In some implementations, the Layer 1 of the wireless device 104 or 204 may receive from higher layers the configuration of at least one of the length of the RA preamble $L_{RA}$, the RA frequency resource, the RA time resource, the length of the PUSCH subcarrier spacing Δf or the RA subcarrier spacing Δ$f_{RA}$. As such, the PRACH sequence may occupy 139 continuous resource elements (e.g., subcarriers). The wireless communication device 104 or 204 may determine $$N_{RB}^{RA}$$

as $$N_{RB}^{RA} = \text{ceil}\left(\frac{139 \cdot 120}{120 \cdot 12}\right) = 12,$$

and determine the frequency position $\bar{k}$ to be an integer value from the set {0, 1, 2, 3, 4, 5}. In a second implementation of Case 1, the wireless communication device 104 or 204 may determine that the RA preamble is to include 283 continuous resource elements with $L_{RA}=283$, determine $N_{RB}^{RA}$ as $$N_{RB}^{RA} = \text{ceil}\left(\frac{283 \cdot 120}{120 \cdot 12}\right) = 24,$$

and determine the frequency position $\overline{k}$ to be an integer value from the set {0, 1, 2, 3, 4, 5}. In a third implementation of Case 1, the wireless communication device 104 or 204 may determine $N_{RB}^{RA}$ as $$N_{RB}^{RA} = \text{ceil}\left(\frac{839 \cdot 120}{120 \cdot 12}\right) = 70,$$

and determine the frequency position $\overline{k}$ to be an integer value from the set {0, 1, 2, 3, 4, 5}. In a fourth implementation of Case 1, the wireless communication device 104 or 204 may determine that the RA preamble is to include 839 continuous resource elements with $L_{RA}=839$, determine $N_{RB}^{RA}$ as $$N_{RB}^{RA} = N'^{RA}_{RB} = 2^{\alpha_1} \cdot 3^{\alpha_2} \cdot 5^{\alpha_3} = 72,$$

with $\alpha_1=3$, $\alpha_2=2$ and $\alpha_3=0$, and determine the frequency position $\overline{k}$ to be an integer value from the set {0, 1, 2, 3, 4, 5, 6, 7, 8, 9, 10, 11, 12, 13, 14, 15, 16, 17, 18, 19, 20, 21, 22, 23, 24, 25}. In a fifth implementation of Case 1, the wireless communication device 104 or 204 may determine that the RA preamble is to include 571 continuous resource elements with $L_{RA}=571$, determine $N_{RB}^{RA}$ as $$N_{RB}^{RA} = \text{ceil}\left(\frac{571 \cdot 120}{120 \cdot 12}\right) = 48,$$

and determine the frequency position $\overline{k}$ to be an integer value from 104 or 204 may determine that the RA preamble is to include 1151 continuous resource elements with $L_{RA}=1151$, determine $N_{RB}^{RA}$ as $$N_{RB}^{RA} = \text{ceil}\left(\frac{1151 \cdot 120}{120 \cdot 12}\right) = 96,$$

and determine the frequency position $\overline{k}$ to be an integer value from the set {0, 1}.

Case 2:

According to a second case or scenario, the subcarrier spacing for RA preamble(s) may be equal to 120 KHz, and the subcarrier spacing for PUSCH may be equal to 240 KHz. In a first implementation of Case 2, the wireless communication device 104 or 204 may determine that the RA preamble is to include 139 continuous resource elements with $L_{RA}=139$, determine $N_{RB}^{RA}$ as $$N_{RB}^{RA} = \text{ceil}\left(\frac{139 \cdot 120}{240 \cdot 12}\right) = 6,$$

and determine the frequency position $\overline{k}$ to be an integer value from the set {0, 1, 2, 3, 4, 5}. In a second implementation of Case 2, the wireless communication device 104 or 204 may determine that the RA preamble is to include 283 continuous resource elements with $L_{RA}=283$, determine $N_{RB}^{RA}$ as $$N_{RB}^{RA} = \text{ceil}\left(\frac{283 \cdot 120}{240 \cdot 12}\right) = 12,$$

and determine the frequency position $\overline{k}$ to be an integer value from the set {0, 1, 2, 3, 4, 5}. In a third implementation of Case 2, the wireless communication device 104 or 204 may determine that the RA preamble is to include 839 continuous resource elements with $L_{RA}=839$, determine $N_{RB}^{RA}$ as $$N_{RB}^{RA} = \text{ceil}\left(\frac{839 \cdot 120}{240 \cdot 12}\right) = 35,$$

and determine the frequency position $\overline{k}$ to be an integer value from the set {0, 1}. In a fourth implementation of Case 2, the wireless communication device 104 or 204 may determine that the RA preamble is to include 839 continuous resource elements with $L_{RA}=839$, determine $$N_{RB}^{RA}$$

as $$N_{RB}^{RA} = N_{RB}'^{RA} = 2^{\alpha_1} \cdot 3^{\alpha_2} \cdot 5^{\alpha_3} = 36,$$

with $\alpha_1=2$, $\alpha_2=2$ and $\alpha_3=0$, and determine the frequency position $\bar{k}$ to be an integer value from the set {0, 1, 2, 3, 4, 5, 6, 7, 8, 9, 10, 11, 12, 13, 14, 15, 16, 17, 18, 19, 20, 21, 22, 23, 24, 25}. In a fifth implementation of Case 2, the wireless communication device 104 or 204 may determine that the RA preamble is to include 571 continuous resource elements with $L_{RA}=839$, determine $$N_{RB}^{RA}$$

as $$N_{RB}^{RA} = \text{ceil}\left(\frac{571 \cdot 120}{240 \cdot 12}\right) = 24,$$

and determine the frequency position $\bar{k}$ to be an integer value from the set {0, 1, 2, 3, 4, 5}. In a sixth implementation of Case 2, the wireless communication device 104 or 204 may determine that the RA preamble is to include 1151 continuous resource elements with $L_{RA}=1151$, determine $$N_{RB}^{RA}$$

as $$N_{RB}^{RA} = \text{ceil}\left(\frac{1151 \cdot 120}{240 \cdot 12}\right) = 48,$$

and determine the frequency position $\bar{k}$ to be an integer value from the set {0, 1}.

Case 3:

According to a third case or scenario, the subcarrier spacing for RA preamble(s) may be equal to 120 KHz, and the subcarrier spacing for PUSCH may be equal to 480 KHz. In a first implementation of Case 3, the wireless communication device 104 or 204 may determine that the RA preamble is to include 139 continuous resource elements with $L_{RA}=139$, determine $$N_{RB}^{RA}$$

as $$N_{RB}^{RA} = \text{ceil}\left(\frac{139 \cdot 120}{480 \cdot 12}\right) = 3,$$

and determine the frequency position $\bar{k}$ to be an integer value from the set {0, 1, 2, 3, 4, 5}. In a second implementation of Case 3, the wireless communication device 104 or 204 may determine that the RA preamble is to include 283 continuous resource elements with $L_{RA}=283$, determine $$N_{RB}^{RA}$$

as $$N_{RB}^{RA} = \text{ceil}\left(\frac{283 \cdot 120}{480 \cdot 12}\right) = 6,$$

and determine the frequency position $\bar{k}$ to be an integer value from the set {0, 1, 2, 3, 4, 5}. In a third implementation of Case 3, the wireless communication device 104 or 204 may determine that the RA preamble is to include 839 continuous resource elements with $L_{RA}=839$, determine $$N_{RB}^{RA}$$

as $$N_{RB}^{RA} = \text{ceil}\left(\frac{839 \cdot 120}{480 \cdot 12}\right) = 18,$$

and determine the frequency position $\bar{k}$ to be an integer value from the set {0, 1, 2, 3, 4, 5, 6, 7, 8, 9, 10, 11, 12, 13, 14, 15, 16, 17, 18, 19, 20, 21, 22, 23, 24, 25}. In a fourth implementation of Case 3, the wireless communication device 104 or 204 may determine that the RA preamble is to include 571 continuous resource elements with $L_{RA}=571$, determine $$N_{RB}^{RA}$$

as $$N_{RB}^{RA} = \text{ceil}\left(\frac{571 \cdot 120}{480 \cdot 12}\right) = 12,$$

and determine the frequency position $\bar{k}$ to be an integer value from the set {0, 1, 2, 3, 4, 5}. In a fifth implementation of Case 3, the wireless communication device 104 or 204 may determine that the RA preamble is to include 1151 continuous resource elements with $L_{RA}=1151$, determine $$N_{RB}^{RA}$$

as $$N_{RB}^{RA} = \text{ceil}\left(\frac{1151 \cdot 120}{480 \cdot 12}\right) = 24,$$

and determine the frequency position $\bar{k}$ to be an integer value from the set {0, 1}.

Case 4:

According to a fourth case or scenario, the subcarrier spacing for RA preamble(s) may be equal to 120 KHz, and the subcarrier spacing for PUSCH may be equal to 960 KHz. In a first implementation of Case 4, the wireless communication device 104 or 204 may determine that the RA preamble is to include 139 continuous resource elements with $L_{RA}=139$, determine $$N_{RB}^{RA}$$

as $$N_{RB}^{RA} = \operatorname{ceil}\left(\frac{139 \cdot 120}{960 \cdot 12}\right) = 2,$$

and determine the frequency position $\bar{k}$ to be an integer value from the set {0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53}. In a second implementation of Case 4, the wireless communication device 104 or 204 may determine that the RA preamble is to include 283 continuous resource elements with $L_{RA}=283$, determine $$N_{RB}^{RA}$$

as $$N_{RB}^{RA} = \operatorname{ceil}\left(\frac{283 \cdot 120}{960 \cdot 12}\right) = 3,$$

and determine the frequency position $\bar{k}$ to be an integer value from the set {0, 1, 2, 3, 4, 5}. In a third implementation of Case 4, the wireless communication device 104 or 204 may determine that the RA preamble is to include 839 continuous resource elements with $L_{RA}=839$, determine $$N_{RB}^{RA}$$

as $$N_{RB}^{RA} = \operatorname{ceil}\left(\frac{839 \cdot 120}{960 \cdot 12}\right) = 9,$$

and determine the frequency position $\bar{k}$ to be an integer value from the set {0, 1, 2, 3, 4, 5, 6, 7, 8, 9, 10, 11, 12, 13, 14, 15, 16, 17, 18, 19, 20, 21, 22, 23, 24, 25}. In a fourth implementation of Case 4, the wireless communication device 104 or 204 may determine that the RA preamble is to include 571 continuous resource elements with $L_{RA}=571$, determine $$N_{RB}^{RA}$$

as $$N_{RB}^{RA} = \operatorname{ceil}\left(\frac{571 \cdot 120}{960 \cdot 12}\right) = 6,$$

and determine the frequency position $\bar{k}$ to be an integer value from the set {0, 1, 2, 3, 4, 5}. In a fifth implementation of Case 4, the wireless communication device 104 or 204 may determine that the RA preamble is to include 1151 continuous resource elements with $L_{RA}=1151$, determine $$N_{RB}^{RA}$$

as $$N_{RB}^{RA} = \operatorname{ceil}\left(\frac{1151 \cdot 120}{960 \cdot 12}\right) = 12,$$

and determine the frequency position $\bar{k}$ to be an integer value from the set {0, 1}.

Case 5:

According to a fifth case or scenario, the subcarrier spacing for RA preamble(s) may be equal to 240 KHz, and the subcarrier spacing for PUSCH may be equal to 120 KHz. In a first implementation of Case 5, the wireless communication device 104 or 204 may determine that the RA preamble is to include occupy 139 continuous resource elements with $L_{RA}=139$, determine $$N_{RB}^{RA}$$

as $$N_{RB}^{RA} = \operatorname{ceil}\left(\frac{139 \cdot 240}{120 \cdot 12}\right) = 24,$$

from the set {0, 1, 2, 3, 4, 5}. In a second implementation of Case 5, the wireless communication device 104 or 204 may determine that the RA preamble is to include 283 continuous resource elements with $L_{RA}=283$, determine $$N_{RB}^{RA}$$

as $$N_{RB}^{RA} = \operatorname{ceil}\left(\frac{283 \cdot 240}{120 \cdot 12}\right) = 48,$$

and determine the frequency position $\bar{k}$ to be an integer value from the set {0, 1, 2, 3, 4, 5}. In a third implementation of Case 5, the wireless communication device 104 or 204 may determine that the RA preamble is to include 839 continuous resource elements with $L_{RA}=839$, determine $$N_{RB}^{RA}$$

as $$N_{RB}^{RA} = \text{ceil}\left(\frac{839 \cdot 240}{120 \cdot 12}\right) = 140,$$

and determine the frequency position $\bar{k}$ to be an integer value from the set {0,1}. In a fourth implementation of Case 5, the wireless communication device 104 and 204 may determine that the RA preamble is to include 839 continuous resource elements with $L_{RA}=839$, determine $$N_{RB}^{RA}$$

as $$N_{RB}^{RA} = N_{RB}'^{RA} = 2^{\alpha_1} \cdot 3^{\alpha_2} \cdot 5^{\alpha_3} = 144,$$

$\alpha_1=2$, $\alpha_2=2$ and $\alpha_3=0$, and determine the frequency position $\bar{k}$ to be an integer value from the set {0, 1, 2, 3, 4, 5, 6, 7, 8, 9, 10, 11, 12, 13, 14, 15, 16, 17, 18, 19, 20, 21, 22, 23, 24, 25}. In a fifth implementation of Case 5, the wireless communication device 104 or 204 may determine that the RA preamble is to include 571 continuous resource elements with $L_{RA}=571$, determine $$N_{RB}^{RA}$$

as $$N_{RB}^{RA} = \text{ceil}\left(\frac{571 \cdot 240}{120 \cdot 12}\right) = 96,$$

and determine the frequency position $\bar{k}$ to be an integer value from the set {0, 1, 2, 3, 4, 5}. In a sixth implementation of Case 5, the wireless communication device 104 or 204 may determine that the RA preamble is to include 1151 continuous resource elements with $L_{RA}=1151$, determine $$N_{RB}^{RA}$$

as $$N_{RB}^{RA} = \text{ceil}\left(\frac{1151 \cdot 240}{120 \cdot 12}\right) = 192,$$

and determine the frequency position $\bar{k}$ to be an integer value from the set {0, 1}.

Case 6:

According to a sixth case or scenario, the subcarrier spacing for RA preamble(s) may be equal to 240 KHz, and the subcarrier spacing for PUSCH may be equal to 240 KHz. In a first implementation of Case 6, the wireless communication device 104 or 204 may determine that the RA preamble is to include 139 continuous resource elements with $L_{RA}=139$, determine $$N_{RB}^{RA}$$

as $$N_{RB}^{RA} = \text{ceil}\left(\frac{139 \cdot 240}{240 \cdot 12}\right) = 12,$$

and determine the frequency position $\bar{k}$ to be an integer value from the set {0, 1, 2, 3, 4, 5}. In a second implementation of Case 6, the wireless communication device 104 or 204 may determine that the RA preamble is to include 283 continuous resource elements with $L_{RA}=283$, determine $$N_{RB}^{RA}$$

as $$N_{RB}^{RA} = \text{ceil}\left(\frac{283 \cdot 240}{240 \cdot 12}\right) = 24,$$

and determine the frequency position $\bar{k}$ to be an integer value from the set {0, 1, 2, 3, 4, 5}. In a third implementation of Case 6, the wireless communication device 104 or 204 may determine that the RA preamble is to include 839 continuous resource elements with $L_{RA}=839$, determine $$N_{RB}^{RA}$$

as $$N_{RB}^{RA} = \text{ceil}\left(\frac{839 \cdot 240}{240 \cdot 12}\right) = 70,$$

and determine the frequency position $\bar{k}$ to be an integer value from the set {0, 1}. In a fourth implementation of Case 6, the wireless communication device 104 or 204 may determine that the RA preamble is to include 839 continuous resource elements with $L_{RA}=839$, determine $$N_{RB}^{RA}$$

as $$N_{RB}^{RA} = N_{RB}'^{RA} = 2^{\alpha_1} \cdot 3^{\alpha_2} \cdot 5^{\alpha_3} = 72,$$

with $\alpha_1=3$, $\alpha_2=2$ and $\alpha_3=0$, and determine the frequency position $\bar{k}$ to be an integer value from the set {0, 1, 2, 3, 4, 5, 6, 7, 8, 9, 10, 11, 12, 13, 14, 15, 16, 17, 18, 19, 20, 21, 22, 23, 24, 25}. In a fifth implementation of Case 6, the wireless communication device 104 or 204 may determine that the RA preamble is to include 571 continuous resource elements with $L_{RA}=571$, determine $$N_{RB}^{RA}$$

as $$N_{RB}^{RA} = \text{ceil}\left(\frac{571 \cdot 240}{240 \cdot 12}\right) = 48,$$

and determine the frequency position $\bar{k}$ to be an integer value from the set {0, 1, 2, 3, 4, 5}. In a sixth implementation of Case 6, the wireless communication device 104 or 204 may determine that the RA preamble is to include 1151 continuous resource elements with $L_{RA}=1151$, determine $$N_{RB}^{RA}$$

as $$N_{RB}^{RA} = \text{ceil}\left(\frac{1151 \cdot 240}{240 \cdot 12}\right) = 96,$$

and determine the frequency position $\bar{k}$ to be an integer value from the set {0, 1}.

Case 7:

According to a seventh case or scenario, the subcarrier spacing for RA preamble(s) may be equal to 240 KHz, and the subcarrier spacing for PUSCH may be equal to 480 KHz. In a first implementation of Case 7, the wireless communication device 104 or 204 may determine that the RA preamble is to include 139 continuous resource elements with $L_{RA}=139$, determine $$N_{RB}^{RA}$$

as $$N_{RB}^{RA} = \text{ceil}\left(\frac{139 \cdot 240}{480 \cdot 12}\right) = 6,$$

and determine the frequency position $\bar{k}$ to be an integer value from the set {0, 1, 2, 3, 4, 5}. In a second implementation of Case 7, the wireless communication device 104 or 204 may determine that the RA preamble is to include 283 continuous resource elements with $L_{RA}=283$, determine $$N_{RB}^{RA}$$

as $$N_{RB}^{RA} = \text{ceil}\left(\frac{283 \cdot 240}{480 \cdot 12}\right) = 12,$$

and determine the frequency position $\bar{k}$ to be an integer value from the set {0, 1, 2, 3, 4, 5}. In a third implementation of Case 7, the wireless communication device 104 or 204 may determine that the RA preamble is to include 839 continuous resource elements with $L_{RA}=839$, determine $$N_{RB}^{RA}$$

as $$N_{RB}^{RA} = \text{ceil}\left(\frac{839 \cdot 240}{480 \cdot 11733311733312}\right) = 35,$$

and determine the frequency position $\bar{k}$ to be an integer value from the set {0, 1}. In a fourth implementation of Case 7, the wireless communication device 104 or 204 may determine that the RA preamble is to include 839 continuous resource elements with $L_{RA}=839$, determine $$N_{RB}^{RA}$$

as $$N_{RB}^{RA} = N_{RB}'^{RA} = 2^{\alpha_1} \cdot 3^{\alpha_2} \cdot 5^{\alpha_3} = 36$$

with $\alpha_1=2$, $\alpha_2=2$ and $\alpha_3=0$, and determine the frequency position $\bar{k}$ to be an integer value from the set {0, 1, 2, 3, 4, 5, 6, 7, 8, 9, 10, 11, 12, 13, 14, 15, 16, 17, 18, 19, 20, 21, 22, 23, 24, 25}. In a fifth implementation of Case 7, the wireless communication device 104 or 204 may determine that the RA preamble is to include 571 continuous resource elements with $L_{RA}=571$, determine $$N_{RB}^{RA}$$

as $$N_{RB}^{RA} = \text{ceil}\left(\frac{571 \cdot 240}{480 \cdot 12}\right) = 24,$$

and determine the frequency position $\bar{k}$ to be an integer value from the set {0, 1, 2, 3, 4, 5}. In a sixth implementation of Case 7, the wireless communication device 104 or 204 may determine that the RA preamble is to include 1151 continuous resource elements with $L_{RA}=1151$, determine $$N_{RB}^{RA}$$

as $$N_{RB}^{RA} = \text{ceil}\left(\frac{1151 \cdot 240}{480 \cdot 12}\right) = 48,$$

and determine the frequency position $\bar{k}$ to be an integer value from the set {0, 1}.

Case 8:

According to an eighth case or scenario, the subcarrier spacing for RA preamble(s) may be equal to 240 KHz, and the subcarrier spacing for PUSCH may be equal to 960 KHz. In a first implementation of Case 8, the wireless communication device 104 or 204 may determine that the RA preamble is to include 139 continuous resource elements with $L_{RA}$=139, determine $$N_{RB}^{RA}$$

as $$N_{RB}^{RA} = \text{ceil}\left(\frac{139 \cdot 240}{960 \cdot 12}\right) = 3,$$

and determine the frequency position $\bar{k}$ to be an integer value from the set {0, 1, 2, 3, 4, 5}. In a second implementation of Case 8, the wireless communication device 104 or 204 may determine that the RA preamble is to include 283 continuous resource elements with $L_{RA}$=283, determine $$N_{RB}^{RA}$$

as $$N_{RB}^{RA} = \text{ceil}\left(\frac{283 \cdot 240}{960 \cdot 12}\right) = 6,$$

and determine the frequency position $\bar{k}$ to be an integer value from the set {0, 1, 2, 3, 4, 5}. In a third implementation of Case 8, the wireless communication device 104 or 204 may determine that the RA preamble is to include 839 continuous resource elements with $L_{RA}$=839, determine $$N_{RB}^{RA}$$

as $$N_{RB}^{RA} = \text{ceil}\left(\frac{839 \cdot 240}{960 \cdot 12}\right) = 18,$$

and determine the frequency position $\bar{k}$ to be an integer value from the set {0, 1, 2, 3, 4, 5, 6, 7, 8, 9, 10, 11, 12, 13, 14, 15, 16, 17, 18, 19, 20, 21, 22, 23, 24, 25}. In a fourth implementation of Case 8, the wireless communication device 104 or 204 may determine that the RA preamble is to include 571 continuous resource elements with $L_{RA}$=571, determine $$N_{RB}^{RA}$$

as $$N_{RB}^{RA} = \text{ceil}\left(\frac{571 \cdot 240}{960 \cdot 12}\right) = 12,$$

and determine the frequency position $\bar{k}$ to be an integer value from the set {0, 1, 2, 3, 4, 5}. In a fifth implementation of Case 8, the wireless communication device 104 or 204 may determine that the RA preamble is to include 1151 continuous resource elements with $L_{RA}$=1151, determine $$N_{RB}^{RA}$$

as $$N_{RB}^{RA} = \text{ceil}\left(\frac{1151 \cdot 240}{960 \cdot 12}\right) = 24,$$

and determine the frequency position $\bar{k}$ to be an integer value from the set {0, 1}.

Case 9:

According to a ninth case or scenario, the subcarrier spacing for RA preamble(s) may be equal to 480 KHz, and the subcarrier spacing for PUSCH may be equal to 120 KHz. In a first implementation of Case 9, the wireless communication device 104 or 204 may determine that the RA preamble is to include occupy 139 continuous resource elements with $L_{RA}$=139, determine $$N_{RB}^{RA}$$

as $$N_{RB}^{RA} = \text{ceil}\left(\frac{139 \cdot 480}{120 \cdot 12}\right) = 47,$$

and determine the frequency position $\bar{k}$ to be an integer value from the set {0, 1, 2}. In a second implementation of Case 9, the wireless communication device 104 or 204 may determine that the RA preamble is to include 139 continuous resource elements with $L_{RA}$=139, determine $$N_{RB}^{RA}$$

as $$N_{RB}^{RA} = N_{RB}'^{RA} = 2^{\alpha_1} \cdot 3^{\alpha_2} \cdot 5^{\alpha_3} = 48$$

with $\alpha_1=4$, $\alpha_2=1$ and $\alpha_3=0$, and determine the frequency position $\overline{k}$ to be an integer value from the set {0, 1, 2, 3, 4, 5}. In a third implementation of Case 9, the wireless communication device 104 or 204 may determine that the RA preamble is to include 283 continuous resource elements with $L_{RA}=283$, determine $$N_{RB}^{RA}$$

as $$N_{RB}^{RA} = \text{ceil}\left(\frac{283 \cdot 480}{120 \cdot 12}\right) = 95,$$

and determine the frequency position $\overline{k}$ to be an integer value from the set {0, 1, 2}. In a fourth implementation of Case 9, the wireless communication device 104 or 204 may determine that the RA preamble is to include 283 continuous resource elements with $L_{RA}=839$, determine $$N_{RB}^{RA}$$

as $$iN_{RB}^{RA} = N_{RB}^{\prime RA} = 2^{\alpha_1} \cdot 3^{\alpha_2} \cdot 5^{\alpha_3} = 96$$

with $\alpha_1=5$, $\alpha_2=1$ and $\alpha_3=0$, and determine the frequency position $\overline{k}$ to be an integer value from the set {0, 1, 2, 3, 4, 5}. In a fifth implementation of Case 9, the wireless communication device 104 or 204 may determine that the RA preamble is to include 839 continuous resource elements with $L_{RA}=839$, determine $$N_{RB}^{RA}$$

as $$N_{RB}^{RA} = \text{ceil}\left(\frac{839 \cdot 480}{120 \cdot 12}\right) = 280,$$

and determine the frequency position $\overline{k}$ to be an integer value from the set {0, 1}. In a sixth implementation of Case 9, the wireless communication device 104 or 204 may determine that the RA preamble is to include 839 continuous resource elements with $L_{RA}=839$, determine $$N_{RB}^{RA}$$

as $$N_{RB}^{RA} = N_{RB}^{\prime RA} = 2^{\alpha_1} \cdot 3^{\alpha_2} \cdot 5^{\alpha_3} = 288,$$

with $\alpha_1=5$, $\alpha_2=2$ and $\alpha_3=0$, and determine the frequency position $\overline{k}$ to be an integer value from the set {0, 1, 2, 3, 4, 5, 6, 7, 8, 9, 10, 11, 12, 13, 14, 15, 16, 17, 18, 19, 20, 21, 22, 23, 24, 25}. In a seventh implementation of Case 9, the wireless communication device 104 or 204 may determine that the RA preamble is to include 571 continuous resource elements with $L_{RA}=571$, determine $$N_{RB}^{RA}$$

as $$N_{RB}^{RA} = \text{ceil}\left(\frac{571 \cdot 480}{120 \cdot 12}\right) = 191,$$

and determine the frequency position $\overline{k}$ to be an integer value from the set {0, 1, 2}. In an eighth implementation of Case 9, the wireless communication device 104 or 204 may determine that the RA preamble is to include 571 continuous resource elements with $L_{RA}=571$, determine $$N_{RB}^{RA}$$

as $$N_{RB}^{RA} = N_{RB}' = 2^{\alpha_1} \cdot 3^{\alpha_2} \cdot 5^{\alpha_3} = 192,$$

with $\alpha_1=6$, $\alpha_2=1$ and $\alpha_3=0$, and determine the frequency position $\overline{k}$ to be an integer communication device 104 or 204 may determine that the RA preamble is to include 1151 continuous resource elements with $L_{RA}=1151$, determine $$N_{RB}^{RA}$$

as $$N_{RB}^{RA} = \text{ceil}\left(\frac{1151 \cdot 480}{120 \cdot 12}\right) = 384,$$

and determine the frequency position $\overline{k}$ to be an integer value from the set {0, 1}.

Case 10:

According to a tenth case or scenario, the subcarrier spacing for RA preamble(s) may be equal to 480 KHz, and the subcarrier spacing for PUSCH may be equal to 240 KHz. In a first implementation of Case 10, the wireless communication device 104 or 204 may determine that the RA preamble is to include 139 continuous resource elements with $L_{RA}=139$, determine $$N_{RB}^{RA}$$

as $$N_{RB}^{RA} = \text{ceil}\left(\frac{139 \cdot 480}{240 \cdot 12}\right) = 24,$$

and determine the frequency position $\bar{k}$ to be an integer value from the set {0, 1, 2, 3, 4, 5}. In a second implementation of Case 10, the wireless communication device 104 or 204 may determine that the RA preamble is to include 283 continuous resource elements with $L_{RA}$=283 determine $$N_{RB}^{RA}$$

as $$N_{RB}^{RA} = \text{ceil}\left(\frac{283 \cdot 480}{240 \cdot 12}\right) = 48,$$

and determine the frequency position $\bar{k}$ to be an integer value from the set {0, 1, 2, 3, 4, 5}. In a third implementation of Case 10, the wireless communication device 104 or 204 may determine that the RA preamble is to include 839 continuous resource elements with $L_{RA}$=839, determine $$N_{RB}^{RA}$$

as $$N_{RB}^{RA} = \text{ceil}\left(\frac{839 \cdot 480}{240 \cdot 12}\right) = 140,$$

and determine the frequency position $\bar{k}$ to be an integer value from the set {0, 1}. In a fourth implementation of Case 10, the wireless communication device 104 or 204 may determine that the RA preamble is to include 839 continuous resource elements with $L_{RA}$=839, determine $$N_{RB}^{RA}$$

as $$N_{RB}^{RA} = N_{RB}^{\prime RA} = 2^{\alpha_1} \cdot 3^{\alpha_2} \cdot 5^{\alpha_3} = 144,$$

with $\alpha_1$=4, $\alpha_2$=2 and $\alpha_3$=0, and determine the frequency position $\bar{k}$ to be an integer value from the set {0, 1, 2, 3, 4, 5, 6, 7, 8, 9, 10, 11, 12, 13, 14, 15, 16, 17, 18, 19, 20, 21, 22, 23, 24, 25}. In a fifth implementation of Case 10, the wireless communication device 104 or 204 may determine that the RA preamble is to include 571 continuous resource elements with $L_{RA}$=571, determine $$N_{RB}^{RA}$$

as $$N_{RB}^{RA} = \text{ceil}\left(\frac{571 \cdot 480}{240 \cdot 12}\right) = 96,$$

and determine the frequency position $\bar{k}$ to be an integer value from the set {0, 1, 2, 3, 4, 5}. In a sixth implementation of Case 10, the wireless communication device 104 or 204 may determine that the RA preamble is to include 1151 continuous resource elements with $L_{RA}$=1151, determine $$N_{RB}^{RA}$$

as $$N_{RB}^{RA} = \text{ceil}\left(\frac{1151 \cdot 480}{24012}\right) = 192,$$

and determine the frequency position $\bar{k}$ to be an integer value from the set {0, 1}.

Case 11:

According to an eleventh case or scenario, the subcarrier spacing for RA preamble(s) may be equal to 480 KHz, and the subcarrier spacing for PUSCH may be equal to 480 KHz. In a first implementation of Case 11, the wireless communication device 104 or 204 may determine that the RA preamble is to include 139 continuous resource elements with $L_{RA}$=139, determine $$N_{RB}^{RA}$$

as $$N_{RB}^{RA} = \text{ceil}\left(\frac{139 \cdot 480}{480 \cdot 12}\right) = 12,$$

and determine the frequency position $\bar{k}$ to be an integer from the set {0, 1, 2, 3, 4, 5}. In a second implementation of Case 11, the wireless communication device 104 or 204 may determine that the RA preamble is to include 283 continuous resource elements with $L_{RA}$=283, determine $$N_{RB}^{RA}$$

as $$N_{RB}^{RA} = \text{ceil}\left(\frac{283 \cdot 480}{480 \cdot 12}\right) = 24,$$

and determine the frequency position $\bar{k}$ to be an integer value from the set {0, 1, 2, 3, 4, 5}. In a third implementation of Case 11, the wireless communication device 104 or 204 may determine that the RA preamble is to include 839 continuous resource elements with $L_{RA}$=839, determine $$N_{RB}^{RA}$$

as $$N_{RB}^{RA} = \left(\frac{839 \cdot 480}{480 \cdot 12}\right) = 70,$$

and determine the frequency position $\bar{k}$ to be an integer value from the set {0, 1}. In a fourth implementation of Case 11, the wireless communication device 104 or 204 may determine that the RA preamble is to include 839 continuous resource elements with $L_{RA}$=839, determine $$N_{RB}^{RA}$$

as $$N_{RB}^{RA} = N_{RB}'^{RA} = 2^{\alpha_1} \cdot 3^{\alpha_2} \cdot 5^{\alpha_3} = 72$$

with $\alpha_1$=6, $\alpha_2$=1 and $\alpha_3$=0, and determine the frequency position $\bar{k}$ to be an integer value from the set {0, 1, 2, 3, 4, 5, 6, 7, 8, 9, 10, 11, 12, 13, 14, 15, 16, 17, 18, 19, 20, 21, 22, 23, 24, 25}. In a fifth implementation of Case 11, the wireless communication device 104 or 204 may determine that the RA preamble is to include 571 continuous resource elements with $L_{RA}$=571, determine $$N_{RB}^{RA}$$

as $$N_{RB}^{RA} = \text{ceil}\left(\frac{571 \cdot 480}{480 \cdot 12}\right) = 48,$$

and determine the frequency position $\bar{k}$ to be an integer value from the set {0, 1, 2, 3, 4, 5}. In a sixth implementation of Case 11, the wireless communication device 104 or 204 may determine that the RA preamble is to include 1151 continuous resource elements with $L_{RA}$=1151, determine $$N_{RB}^{RA}$$

as $$N_{RB}^{RA} = \text{ceil}\left(\frac{1151 \cdot 480}{480 \cdot 12}\right) = 96,$$

and determine the frequency position $\bar{k}$ to be an integer value from the set {0, 1}.

Case 12:

According to a twelfth case or scenario, the subcarrier spacing for RA preamble(s) may be equal to 480 KHz, and the subcarrier spacing for PUSCH may be equal to 960 KHz. In a first implementation of Case 12, the wireless communication device 104 or 204 may determine that the RA preamble is to include 139 continuous resource elements with $L_{RA}$=139, determine $$N_{RB}^{RA}$$

as $$N_{RB}^{RA} = \text{ceil}\left(\frac{139 \cdot 480}{960 \cdot 12}\right) = 6,$$

and determine the frequency position $\bar{k}$ to be an integer value from the set {0, 1, 2, 3, 4, 5}. In a second implementation of Case 12, the wireless communication device 104 or 204 may determine that the RA preamble is to include 283 continuous resource elements with $L_{RA}$=283, determine $$N_{RB}^{RA}$$

as $$N_{RB}^{RA} = \text{ceil}\left(\frac{283 \cdot 480}{960 \cdot 12}\right) = 12,$$

and determine the frequency position $\bar{k}$ to be an integer value from the set {0, 1, 2, 3, 4, 5}. In a third implementation of Case 12, the wireless communication device 104 or 204 may determine that the RA preamble is to include 839 continuous resource elements with $L_{RA}$=839, determine $$N_{RB}^{RA}$$

as $$N_{RB}^{RA} = \text{ceil}\left(\frac{839 \cdot 480}{960 \cdot 12}\right) = 35,$$

and determine the frequency position $\bar{k}$ to be an integer value from the set {0,1}. In a fourth implementation of Case 12, the wireless communication device 104 or 204 may determine that the RA preamble is to include 839 continuous resource elements with $L_{RA}$=839, determine $$N_{RB}^{RA}$$

as $$N_{RB}^{RA} = N_{RB}'^{RA} = 2^{\alpha_1} \cdot 3^{\alpha_2} \cdot 5^{\alpha_3} = 36,$$

with $\alpha_1$=2, $\alpha_2$=2 and $\alpha_3$=0, and determine the frequency position $\bar{k}$ to be an integer value from the set {0, 1, 2, 3, 4, 5, 6, 7, 8, 9, 10, 11, 12, 13, 14, 15, 16, 17, 18, 19, 20, 21, 22, 23, 24, 25}. In a fifth implementation of Case 12, the wireless communication device 104 or 204 may determine that the RA preamble is to include 571 continuous resource elements with $L_{RA}=571$, determine $$N_{RB}^{RA}$$

as $$N_{RB}^{RA} = \text{ceil}\left(\frac{571 \cdot 480}{960 \cdot 12}\right) = 24,$$

and determine the frequency position $\bar{k}$ to be an integer value from the set {0, 1, 2, 3, 4, 5}. In a sixth implementation of Case 12, the wireless communication device 104 or 204 may determine that the RA preamble is to include 1151 continuous resource elements with $L_{RA}=1151$, determine $$N_{RB}^{RA}$$

as $$N_{RB}^{RA} = \text{ceil}\left(\frac{1151 \cdot 480}{960 \cdot 12}\right) = 48,$$

and determine the frequency position $\bar{k}$ to be an integer value from the set {0, 1}.

Case 13:

According to a thirteenth case or scenario, the subcarrier spacing for RA preamble(s) may be equal to 960 KHz, and the subcarrier spacing for PUSCH may be equal to 120 KHz. In a first implementation of Case 13, the wireless communication device 104 or 204 may determine that the RA preamble is to include occupy 139 continuous resource elements with $L_{RA}=139$, determine $$N_{RB}^{RA}$$

as $$N_{RB}^{RA} = \text{ceil}\left(\frac{139 \cdot 960}{120 \cdot 12}\right) = 93,$$

and determine the frequency position $\bar{k}$ to be an integer value from the set {0, 1}. In a second implementation of Case 13, the wireless communication device 104 or 204 may determine that the RA preamble is to include 139 continuous resource elements with $L_{RA}=139$, determine $$N_{RB}^{RA}$$

as $$N_{RB}^{RA} = N_{RB}^{\prime RA} = 2^{\alpha_1} \cdot 3^{\alpha_2} \cdot 5^{\alpha_3} = 96$$

with $\alpha_1=5$, $\alpha_2=1$ and $\alpha_3=0$, and determine the frequency position $\bar{k}$ to be an integer value from the set {0, 1, 2, 3, 4, 5}. In a third implementation of Case 13, the wireless communication device 104 or 204 may determine that the RA preamble is to include 283 continuous resource elements with $L_{RA}=283$ determine $$N_{RB}^{RA}$$

as $$N_{RB}^{RA} = \text{ceil}\left(\frac{283 \cdot 960}{120 \cdot 12}\right) = 189,$$

and determine the frequency position $\bar{k}$ to be an integer value from the set {0, 1}. In a fourth implementation of Case 13, the wireless communication device 104 or 204 may determine that the RA preamble is to include 283 continuous resource elements with $L_{RA}=283$, determine $$N_{RB}^{RA}$$

as $$N_{RB}^{RA} = N_{RB}^{\prime RA} = 2^{\alpha_1} \cdot 3^{\alpha_2} \cdot 5^{\alpha_3} = 192$$

with $\alpha_1=6$, $\alpha_2=1$ and $\alpha_3=0$, and determine the frequency position $\bar{k}$ to be an integer value from the set {0, 1, 2, 3, 4, 5}. In a fifth implementation of Case 13, the wireless communication device 104 or 204 may determine that the RA preamble is to include 839 continuous resource elements with $L_{RA}=839$, determine $$N_{RB}^{RA}$$

as $$N_{RB}^{RA} = \text{ceil}\left(\frac{839 \cdot 960}{120 \cdot 12}\right) = 560,$$

and determine the frequency position $\bar{k}$ to be an integer value from the set {0, 1}. In a sixth implementation of Case 13, the wireless communication device 104 or 204 may determine that the RA preamble is to include 839 continuous resource elements with $L_{RA}=839$, determine $$N_{RB}^{RA}$$

as $$N_{RB}^{RA} = N_{RB}^{\prime RA} = 2^{\alpha_1} \cdot 3^{\alpha_2} \cdot 5^{\alpha_3} = 576,$$

with $\alpha_1=6$, $\alpha_2=2$ and $\alpha_3=0$, and determine the frequency position $\bar{k}$ to be an integer value from the set {0, 1, 2, 3, 4, 5, 6, 7, 8, 9, 10, 11, 12, 13, 14, 15, 16, 17, 18, 19, 20, 21, 22, 23, 24, 25}. In a seventh implementation of Case 13, the wireless communication device 104 or 204 may determine that the RA preamble is to include 571 continuous resource elements with $L_{RA}=571$, determine $$N_{RB}^{RA}$$

as $$N_{RB}^{RA} = \text{ceil}\left(\frac{571 \cdot 960}{120 \cdot 12}\right) = 381,$$

and determine the frequency position $\bar{k}$ to be an integer value from the set {0, 1}. In an eighth implementation of Case 13, the wireless communication device 104 or 204 may determine that the RA preamble is to include 571 continuous resource elements with $L_{RA}=571$, determine $$N_{RB}^{RA}$$

as $$N_{RB}^{RA} = N_{RB}^{\prime RA} = 2^{\alpha_1} \cdot 3^{\alpha_2} \cdot 5^{\alpha_3} = 384,$$

with $\alpha_1=7$, $\alpha_2=1$ and $\alpha_3=0$, and determine the frequency position $\bar{k}$ to be an integer value from the set {0, 1, 2, 3, 4, 5}. In a ninth implementation of Case 13, the wireless communication device 104 or 204 may determine that the RA preamble is to include 1151 continuous resource elements with $L_{RA}=1151$, determine $$N_{RB}^{RA}$$

as $$N_{RB}^{RA} = \text{ceil}\left(\frac{1151 \cdot 960}{120 \cdot 12}\right) = 768,$$

and determine the frequency position $\bar{k}$ to be an integer value from the set {0, 1}.

Case 14:

According to a fourteenth case or scenario, the subcarrier spacing for RA preamble(s) may be equal to 960 KHz, and the subcarrier spacing for PUSCH may be equal to 240 KHz. In a first implementation of Case 14, the wireless communication device 104 or 204 may determine that the RA preamble is to include 139 continuous resource elements with $L_{RA}=139$, determine $$N_{RB}^{RA}$$

as $$N_{RB}^{RA} = \text{ceil}\left(\frac{139 \cdot 960}{240 \cdot 12}\right) = 47,$$

and determine the frequency position $\bar{k}$ to be an integer value from the set {0, 1, 2}. In a second implementation of Case 14, the wireless communication device 104 or 204 may determine that the RA preamble is to include 139 continuous resource elements with $L_{RA}=139$, determine $$N_{RB}^{RA}$$

as $$N_{RB}^{RA} = N_{RB}^{\prime RA} = 2^{\alpha_1} \cdot 3^{\alpha_2} \cdot 5^{\alpha_3} = 48,$$

with $\alpha_1=4$, $\alpha_2=1$ and $\alpha_3=0$, and determine the frequency position $\bar{k}$ to be an integer value from the set {0, 1, 2, 3, 4, 5}. In a third implementation of Case 14, the wireless communication device 104 or 204 may determine that the RA preamble is to include 283 continuous resource elements with $L_{RA}=283$, determine $$N_{RB}^{RA}$$

as $$N_{RB}^{RA} = \text{ceil}\left(\frac{283 \cdot 960}{240 \cdot 12}\right) = 95,$$

and determine the frequency position $\bar{k}$ to be an integer value from the set {0, 1, 2}. In a fourth implementation of Case 14, the wireless communication device 104 or 204 may determine that the RA preamble is to include 283 continuous resource elements with $L_{RA}=283$, determine $$N_{RB}^{RA}$$

as $$N_{RB}^{RA} = N_{RB}^{\prime RA} = 2^{\alpha_1} \cdot 3^{\alpha_2} \cdot 5^{\alpha_3} = 96,$$

with $\alpha_1=5$, $\alpha_2=1$ and $\alpha_3=0$, and determine the frequency position $\bar{k}$ to be an integer value from the set {0, 1, 2, 3, 4, 5}. In a fifth implementation of Case 14, the wireless communication device 104 or 204 may determine that the RA preamble is to include 839 continuous resource elements with $L_{RA}=839$, determine $$N_{RB}^{RA}$$

$$N_{RB}^{RA} = \text{ceil}\left(\frac{839 \cdot 960}{240 \cdot 12}\right) = 280,$$

and determine the frequency position $\bar{k}$ to be an integer value from the set {0, 1}. In a sixth implementation of Case 14, the wireless communication device 104 or 204 may determine that the RA preamble is to include 839 continuous resource elements with $L_{RA}$=839, determine $$N_{RB}^{RA}$$

as $$N_{RB}^{RA} = N_{RB}^{\prime RA} = 2^{\alpha_1} \cdot 3^{\alpha_2} \cdot 5^{\alpha_3} = 288,$$

with $\alpha_1$=5, $\alpha_2$=2 and $\alpha_3$=0, and determine the frequency position $\bar{k}$ to be an integer value from the set {0, 1, 2, 3, 4, 5, 6, 7, 8, 9, 10, 11, 12, 13, 14, 15, 16, 17, 18, 19, 20, 21, 22, 23, 24, 25}. In a seventh implementation of Case 14, the wireless communication device 104 or 204 may determine that the RA preamble is to include 571 continuous resource elements with $L_{RA}$=571, determine $$N_{RB}^{RA}$$

as $$N_{RB}^{RA} = \text{ceil}\left(\frac{571 \cdot 960}{240 \cdot 12}\right) = 191,$$

and determine the frequency position $\bar{k}$ to be an integer value from the set {0, 1, 2}. In an eighth implementation of Case 14, the wireless communication device 104 or 204 may determine that the RA preamble is to include 571 continuous resource elements with $L_{RA}$=571, determine $$N_{RB}^{RA}$$

as $$N_{RB}^{RA} = N_{RB}^{\prime RA} = 2^{\alpha_1} \cdot 3^{\alpha_2} \cdot 5^{\alpha_3} = 192,$$

with $\alpha_1$=6, $\alpha_2$=1 and $\alpha_3$=0, and determine the frequency position $\bar{k}$ to be an integer value from the set {0, 1, 2, 3, 4, 5}. In a ninth implementation of Case 14, the wireless communication device 104 or 204 may determine that the RA preamble is to include 1151 continuous resource elements with $L_{RA}$=1151, determine $$N_{RB}^{RA}$$

as $$N_{RB}^{RA} = \text{ceil}\left(\frac{1151 \cdot 960}{240 \cdot 12}\right) = 384,$$

and determine the frequency position $\bar{k}$ to be an integer value from the set {0, 1}.

Case 15:

According to a fifteenth case or scenario, the subcarrier spacing for RA preamble(s) may be equal to 960 KHz, and the subcarrier spacing for PUSCH may be equal to 480 KHz. In a first implementation of Case 15, the wireless communication device 104 or 204 may determine that the RA preamble is to include 139 continuous resource elements with $L_{RA}$=139, determine $$N_{RB}^{RA}$$

as $$N_{RB}^{RA} = \text{ceil}\left(\frac{139 \cdot 960}{480 \cdot 12}\right) = 24,$$

and determine the frequency position $\bar{k}$ to be an integer value from the set {0, 1, 2, 3, 4, 5}. In a second implementation of Case 15, the wireless communication device 104 or 204 may determine that the RA preamble is to include 283 continuous resource elements with $L_{RA}$=283, determine $$N_{RB}^{RA}$$

as $$N_{RB}^{RA} = \text{ceil}\left(\frac{283 \cdot 960}{480 \cdot 12}\right) = 48,$$

and determine the frequency position $\bar{k}$ to be an integer value from the set {0, 1, 2, 3, 4, 5}. In a third implementation of Case 15, the wireless communication device 104 or 204 may determine that the RA preamble is to include 839 continuous resource elements with $L_{RA}$=839, determine $$N_{RB}^{RA}$$

as $$N_{RB}^{RA} = \left(\frac{839 \cdot 960}{480 \cdot 12}\right) = 140,$$

and determine the frequency position $\bar{k}$ to be an integer value from the set {0, 1}. In a fourth implementation of Case 15, the wireless communication device 104 or 204 may deter mine that the RA preamble is to include 839 continuous resource elements with $L_{RA}=839$, determine $$N_{RB}^{RA}$$

as $$N_{RB}^{RA} = N_{RB}'^{RA} = 2^{\alpha_1} \cdot 3^{\alpha_2} \cdot 5^{\alpha_3} = 144$$

with $\alpha_1=4$, $\alpha_2=2$ and $\alpha_3=0$, and determine the frequency position $\bar{k}$ to be an integer value from the set {0, 1, 2, 3, 4, 5, 6, 7, 8, 9, 10, 11, 12, 13, 14, 15, 16, 17, 18, 19, 20, 21, 22, 23, 24, 25}. In a fifth implementation of Case 15, the wireless communication device 104 or 204 may determine that the RA preamble is to include 571 continuous resource elements with $L_{RA}=571$, determine $$N_{RB}^{RA}$$

as $$N_{RB}^{RA} = \text{ceil}\left(\frac{571 \cdot 960}{480 \cdot 12}\right) = 96,$$

and determine the frequency position $\bar{k}$ to be an integer value from the set {0, 1, 2, 3, 4, 5}. In a sixth implementation of Case 15, the wireless communication device 104 or 204 may determine that the RA preamble is to include 1151 continuous resource elements with $L_{RA}=1151$, determine $$N_{RB}^{RA}$$

as $$N_{RB}^{RA} = \text{ceil}\left(\frac{1151 \cdot 960}{480 \cdot 12}\right) = 192,$$

and determine the frequency position $\bar{k}$ to be an integer value value from the set {0, 1}.
Case 16:
According to a sixteenth case or scenario, the subcarrier spacing for RA preamble(s) may be equal to 960 KHz, and the subcarrier spacing for PUSCH may be equal to 960 KHz. In a first implementation of Case 16, the wireless communication device 104 or 204 may determine that the RA preamble is to include 139 continuous resource elements with $L_{RA}=139$, determine $$N_{RB}^{RA}$$

as $$N_{RB}^{RA} = \text{ceil}\left(\frac{139 \cdot 960}{960 \cdot 12}\right) = 12,$$

and determine the frequency position $\bar{k}$ to be an integer value from the set {0, 1, 2, 3, 4, 5}. In a second implementation of Case 16, the wireless communication device 104 or 204 may determine that the RA preamble is to include 283 continuous resource elements with $L_{RA}=283$, determine $$N_{RB}^{RA}$$

as $$N_{RB}^{RA} = \text{ceil}\left(\frac{283 \cdot 960}{960 \cdot 12}\right) = 24,$$

and determine the frequency position $\bar{k}$ to be an integer value from the set {0, 1, 2, 3, 4, 5}. In a third implementation of Case 16, the wireless communication device 104 or 204 may determine that the RA preamble is to include 839 continuous resource elements with $L_{RA}=839$, determine $$N_{RB}^{RA}$$

as $$N_{RB}^{RA} = \text{ceil}\left(\frac{839 \cdot 960}{960 \cdot 12}\right) = 70,$$

and determine the frequency position $\bar{k}$ to be an integer value from the set {0,1}. In a fourth implementation of Case 16, the wireless communication device 104 or 204 may determine that the RA preamble is to include 839 continuous resource elements with $L_{RA}=839$, determine $$N_{RB}^{RA}$$

as $$N_{RB}^{RA} = N_{RB}'^{RA} = 2^{\alpha_1} \cdot 3^{\alpha_2} \cdot 5^{\alpha_3} = 72,$$

with $\alpha_1=3$, $\alpha_2=2$ and $\alpha_3=0$, and determine the frequency position $\bar{k}$ to be an integer value from the set {0, 1, 2, 3, 4, 5, 6, 7, 8, 9, 10, 11, 12, 13, 14, 15, 16, 17, 18, 19, 20, 21, 22, 23, 24, 25}. In a fifth implementation of Case 16, the wireless communication device 104 or 204 may determine that the RA preamble is to include 571 continuous resource elements with $L_{RA}=571$, determine $$N_{RB}^{RA}$$

as $$N_{RB}^{RA} = \text{ceil}\left(\frac{571 \cdot 960}{960 \cdot 12}\right) = 48,$$

and determine the frequency position $\bar{k}$ to be an integer value from the set {0, 1, 2, 3, 4, 5}. In a sixth implementation of Case 12, the wireless communication device 104 or 204 may determine that the RA preamble is to include 1151 continuous resource elements with $L_{RA}$=1151, determine $$N_{RB}^{RA}$$

as $$N_{RB}^{RA} = \text{ceil}\left(\frac{1151 \cdot 960}{960 \cdot 12}\right) = 96,$$

and determine the frequency position $\bar{k}$ to be an integer value from the set {0, 1}.

In any of the cases above and any of the corresponding implementations, the wireless communication node 102 or 202 may configure at least one of the length of the RA preamble $L_{RA}$, the RA frequency resource, the RA time resource, the length of the PUSCH subcarrier spacing $\Delta f$ or the RA subcarrier spacing $\Delta f_{RA}$ and signal the configured parameter(s) to the wireless communication device 104 or 204. The Layer 1 of the wireless communication device 104 or 204 may receive from higher layers the configuration of at least one of the length of the RA preamble $L_{RA}$, the RA frequency resource, the RA time resource, the length of the PUSCH subcarrier spacing $\Delta f$ or the RA subcarrier spacing $\Delta f_{RA}$.

The various embodiments described above and in the claims can be implemented as computer code instructions that are executed by one or more processors of the wireless communication device (or UE) 104 04 204 or the wireless communication node 102 or 202. A computer-readable medium may store the computer code instructions.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module"), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the embodiments described in this disclosure will be readily apparent to those skilled in the art, and the general principles defined herein can be applied to other embodiments without departing from the scope of this disclosure. Thus, the disclosure is not intended to be limited to the embodiments shown herein, but is to be accorded the widest scope consistent with the novel features and principles disclosed herein, as recited in the claims below.

The invention claimed is:

1. A method comprising:
    determining, by a wireless communication device, a number of resource blocks to be occupied by a random access preamble $$\left(N_{RB}^{RA}\right)$$

and a physical random access channel (PRACH) frequency position parameter ($\bar{k}$) according to $L_{RA}$, $\Delta f_{RA}$, and $\Delta f$, wherein
    $\bar{k}$ is a non-negative integer value representing a number of $\Delta f_{RA}$ units,
    $L_{RA}$ is a length of the random access preamble in terms of resource elements, $\Delta f$ is a subcarrier spacing for a physical uplink shared channel (PUSCH), and $\Delta f_{RA}$ is a subcarrier spacing for the random access preamble, and
    a frequency offset between a center of the PUSCH and a start of the random access preamble is equal to a sum of $\bar{k}$ and $\Delta f$; and
    transmitting, by the wireless communication device, the random access preamble with resource blocks allocated according to: (i) the $$N_{RB}^{RA}$$

and (ii) the $\bar{k}$,
    wherein the $$N_{RB}^{RA}$$

and $\bar{k}$ are determined:
    in response to $\Delta f_{RA}$=120 KHz, $\Delta f$=120 KHz, $L_{RA}$=139, $$N_{RB}^{RA} = 12$$

and $\bar{k}$ is 2;
    in response to $\Delta f_{RA}$=120 KHz, $\Delta f$=120 KHz, $L_{RA}$=571, $$N_{RB}^{RA} = 48$$

and $\bar{k}$ is 2;
    in response to $\Delta f_{RA}$=120 KHz, $\Delta f$=480 KHz, $L_{RA}$=139, $$N_{RB}^{RA} = 3$$

and $\bar{k}$ is 1;
    in response to $\Delta f_{RA}$=120 KHz, $\Delta f$=480 KHz, $L_{RA}$=571, $$N_{RB}^{RA} = 12$$

and $\bar{k}$ is 1;
    in response to $\Delta f_{RA}$=120 KHz, $\Delta f$=960 KHz, $L_{RA}$=139, $$N_{RB}^{RA} = 2$$

and $\bar{k}$ is 23;
    in response to $\Delta f_{RA}$=480 KHz, $\Delta f$=120 KHz, $L_{RA}$=571, $$N_{RB}^{RA} = 192$$

$\bar{k}$ is 2;
    in response to $f_{RA}$=480 KHz, $\Delta f$=480 KHz, $L_{RA}$=139, $$N_{RB}^{RA} = 12$$

and $\bar{k}$ is 2;
    in response to $\Delta f_{RA}$=480 KHz, $\Delta f$=480 KHz, $L_{RA}$=571, $$N_{RB}^{RA} = 48$$

and $\bar{k}$ is 2;
    in response to $\Delta f_{RA}$=480 KHz, $\Delta f$=960 KHz, $L_{RA}$=139, $$N_{RB}^{RA} = 6$$

and $\bar{k}$ is 2;
in response to $f_{RA}=480$ KHz, $\Delta f=960$ KHz, $L_{RA}=571$, $$N_{RB}^{RA} = 24$$

and $\bar{k}$ is 2;
in response to $\Delta f_{RA}=960$ KHz, $\Delta f=480$ KHz, $L_{RA}=139$, $$N_{RB}^{RA} = 24$$

and $\bar{k}$ is 2; or
in response to $\Delta f_{RA}=960$ KHz, $\Delta f=960$ KHz, $L_{RA}=139$, $$N_{RB}^{RA} = 12$$

and $\bar{k}$ is 2.

2. The method of claim 1, wherein the $$N_{RB}^{RA}$$

is determined by:

$$N_{RB}^{RA} = \operatorname{ceil}(((L_{RA} \cdot \Delta f_{RA})/(\Delta f \cdot M))), M \text{ is } 12$$

which represents a number of resource elements in one resource block.

3. A method comprising:
receiving, by a wireless communication node, a random access preamble transmitted from a wireless communication device according to resource blocks that are allocated according to a number of resource blocks occupied by a random access preamble $$(N_{RB}^{RA})$$

and a physical random access channel (PRACH) frequency position parameter ($\bar{k}$) according to $L_{RA}$, $\Delta f_{RA}$, and $\Delta f$, wherein
$\bar{k}$ is a non-negative integer value representing a number of $\Delta f_{RA}$ units, $L_{RA}$ is a length of the random access preamble in terms of resource elements, $\Delta f$ is a subcarrier spacing for a physical uplink shared channel (PUSCH), and $f_{RA}$ is a subcarrier spacing for the random access preamble, and
a frequency offset between a center of the PUSCH and a start of the random access preamble is equal to a sum of $\bar{k}$ and $\Delta f$,
wherein the $$N_{RB}^{RA}$$

and $\bar{k}$ are determined:
in response to $f_{RA}=120$ KHz, $\Delta f=120$ KHz, $L_{RA}=139$, $$N_{RB}^{RA} = 12$$

and $\bar{k}$ is 2;
in response to $f_{RA}=120$ KHz, $\Delta f=120$ KHz, $L_{RA}=571$, $$N_{RB}^{RA} = 48$$

and $\bar{k}$ is 2;
in response to $f_{RA}=120$ KHz, $\Delta f=480$ KHz, $L_{RA}=139$, $$N_{RB}^{RA} = 3$$

and $\bar{k}$ is 1;
in response to $f_{RA}=120$ KHz, $f=480$ KHz, $L_{RA}=571$, $$N_{RB}^{RA} = 12$$

and $\bar{k}$ is 1;
in response to $\Delta f_{RA}=120$ KHz, $\Delta f=960$ KHz, $L_{RA}=139$, $$N_{RB}^{RA} = 2$$

and $\bar{k}$ is 23;
in response to $\Delta f_{RA}=480$ KHz, $\Delta f=120$ KHz, $L_{RA}=571$, $$N_{RB}^{RA} = 192$$

$\bar{k}$ is 2;
in response to $f_{RA}=480$ KHz, $\Delta f=480$ KHz, $L_{RA}=139$, $$N_{RB}^{RA} = 12$$

and $\bar{k}$ is 2;
in response to $\Delta f_{RA}=480$ KHz, $\Delta f=480$ KHz, $L_{RA}=571$, $$N_{RB}^{RA} = 48$$

and $\bar{k}$ is 2;
in response to $\Delta f_{RA}=480$ KHz, $\Delta f=960$ KHz, $L_{RA}=139$, $$N_{RB}^{RA} = 6$$

and $\overline{k}$ is 2;
in response to $\Delta f_{RA}$=480 KHz, $\Delta f$=960 KHz, $L_{RA}$=571, $$N_{RB}^{RA} = 24$$

and $\overline{k}$ is 2;
in response to $\Delta f_{RA}$=960 KHz, $\Delta f$=480 KHz, $L_{RA}$=139, $$N_{RB}^{RA} = 24$$

and $\overline{k}$ is 2; or
in response to $\Delta f_{RA}$=960 KHz, $\Delta f$=960 KHz, $L_{RA}$=139, $$N_{RB}^{RA} = 12$$

and $\overline{k}$ is 2.

4. A wireless communication device comprising:
at least one processor configured to:
determine a number of resource blocks to be occupied by a random access preamble $$\left(N_{RB}^{RA}\right)$$

and a physical random and a physical random access channel (PRACH) frequency position parameter ($\overline{k}$) according to $L_{RA}$, $\Delta f_{RA}$, and $\Delta f$, wherein
$\overline{k}$ is a non-negative integer value representing a number of $\Delta f_{RA}$ units,
$L_{RA}$ is a length of the random access preamble in terms of resource elements, $\Delta f$ is a subcarrier spacing for a physical uplink shared channel (PUSCH), and $\Delta f_{RA}$ is a subcarrier spacing for the random access preamble, and
a frequency offset between a center of the PUSCH and a start of the random access preamble is equal to a sum of $\overline{k}$ and $\Delta f$; and
transmit, via a transmitter, the random access preamble with resource blocks allocated according to: (i) the $$N_{RB}^{RA}$$

and (ii) the $\overline{k}$,
wherein the $$N_{RB}^{RA}$$

and $\overline{k}$ are determined:
in response to $\Delta f_{RA}$=120 KHz, $\Delta f$=120 KHz, $L_{RA}$=139, $$N_{RB}^{RA} = 12$$

and $\overline{k}$ is 2;
in response to $\Delta f_{RA}$=120 KHz, f=120 KHz, $L_{RA}$=571, $$N_{RB}^{RA} = 48$$

and $\overline{k}$ is 2;
in response to $\Delta f_{RA}$=120 KHz, f=480 KHz, $L_{RA}$=139, $$N_{RB}^{RA} = 3$$

and $\overline{k}$ is 1;
in response to $\Delta f_{RA}$=120 KHz, f=480 KHz, $L_{RA}$=571, $$N_{RB}^{RA} = 12$$

and $\overline{k}$ is 1;
in response to $\Delta f_{RA}$=120 KHz, $\Delta f$=960 KHz, $L_{RA}$=139, $$N_{RB}^{RA} = 2$$

and $\overline{k}$ is 23;
in response to $\Delta f_{RA}$=480 KHz, $\Delta f$=120 KHz, $L_{RA}$=571, $$N_{RB}^{RA} = 192$$

$\overline{k}$ is 2;
in response to $f_{RA}$=480 KHz, $\Delta f$=480 KHz, $L_{RA}$=139, $$N_{RB}^{RA} = 12$$

and $\overline{k}$ is 2;
in response to $f_{RA}$=480 KHz, $\Delta f$=480 KHz, $L_{RA}$=571, $$N_{RB}^{RA} = 48$$

and $\overline{k}$ is 2;
in response to $\Delta f_{RA}$=480 KHz, $\Delta f$=960 KHz, $L_{RA}$=139, $$N_{RB}^{RA} = 6$$

and $\overline{k}$ is 2;
in response to $\Delta f_{RA}$=480 KHz, $\Delta f$=960 KHz, $L_{RA}$=571, $$N_{RB}^{RA} = 24$$

and $\bar{k}$ is 2;
in response to $\Delta f_{RA}$=960 KHz, $\Delta f$=480 KHz, $L_{RA}$=139, $$N_{RB}^{RA} = 24$$

and $\bar{k}$ is 2; or
in response to $\Delta f_{RA}$=960 KHz, $\Delta f$=960 KHz, $L_{RA}$=139, $$N_{RB}^{RA} = 12$$

and $\bar{k}$ is 2.

5. A wireless communication node comprising:
at least one processor configured to:
receive, via a receiver, a random access preamble transmitted from a wireless communication device according to resource blocks that are allocated according to a number of resource blocks occupied by a random access preamble $$\left(N_{RB}^{RA}\right)$$

and a physical random access channel (PRACH) frequency position parameter ($\bar{k}$) according to $L_{RA}$, $\Delta f_{RA}$, and $\Delta f$, wherein
$\bar{k}$ is a non-negative integer value representing a number of $\Delta f_{RA}$ units, $L_{RA}$ is a length of the random access preamble in terms of resource elements, $\Delta f$ is a sub-carrier spacing for a physical uplink shared channel (PUSCH), and $\Delta f_{RA}$ is a subcarrier spacing for the random access preamble, and
a frequency offset between a center of the PUSCH and a start of the random access preamble is equal to a sum of $\bar{k}$ and $\Delta f$,
wherein the $$N_{RB}^{RA}$$

and $\bar{k}$ are determined:
in response to $\Delta f_{RA}$=120 KHz, $\Delta f$=120 KHz, $L_{RA}$=139, $$N_{RB}^{RA} = 12$$

and $\bar{k}$ is 2;
in response to $\Delta f_{RA}$=120 KHz, $\Delta f$=120 KHz, $L_{RA}$=571, $$N_{RB}^{RA} = 48$$

and $\bar{k}$ is 2;
in response to $\Delta f_{RA}$=120 KHz, f=480 KHz, $L_{RA}$=139, $$N_{RB}^{RA} = 3$$

and $\bar{k}$ is 1;
in response to $\Delta f_{RA}$=120 KHz, f=480 KHz, $L_{RA}$=571, $$N_{RB}^{RA} = 12$$

and $\bar{k}$ is 1;
in response to $f_{RA}$=120 KHz, f=960 KHz, $L_{RA}$=139, $$N_{RB}^{RA} = 2$$

and $\bar{k}$ is 23;
in response to $\Delta f_{RA}$=480 KHz, $\Delta f$=120 KHz, $L_{RA}$=571, $$N_{RB}^{RA} = 192$$

$\bar{k}$ is 2;
in response to $\Delta f_{RA}$=480 KHz, f=480 KHz, $L_{RA}$=139, $$N_{RB}^{RA} = 12$$

and is 2;
in response to $\Delta f_{RA}$=480 KHz, $\Delta f$=480 KHz, $L_{RA}$=571, $$N_{RB}^{RA} = 48$$

and $\bar{k}$ is 2;
in response to $\Delta f_{RA}$=480 KHz, $\Delta f$=960 KHz, $L_{RA}$=139, $$N_{RB}^{RA} = 6$$

and $\bar{k}$ is 2;
in response to $\Delta f_{RA}$=480 KHz, $\Delta f$=960 KHz, $L_{RA}$=571, $$N_{RB}^{RA} = 24$$

and $\bar{k}$ is 2;
in response to $\Delta f_{RA}$=960 KHz, $\Delta f$=480 KHz, $L_{RA}$=139, $$N_{RB}^{RA} = 24$$

and $\bar{k}$ is 2; or
in response to $\Delta f_{RA}$=960 KHz, $\Delta f$=960 KHz, $L_{RA}$=139, $$N_{RB}^{RA} = 12$$

and $\bar{k}$ is 2.

6. The wireless communication node of claim 5, wherein $$N_{RB}^{RA}$$

is determined by: $N_{RB}^{RA}=\text{ceil}(((L_{RA}\cdot\Delta f_{RA})/(\Delta f\cdot M)))$, M is 12 which represents a number of resource elements in one resource block.

7. The method of claim 3, wherein the $$N_{RB}^{RA}$$

is determined by:

$$N_{RB}^{RA} = \text{ceil}(((L_{RA}\cdot\Delta f_{RA})/(\Delta f\cdot M))), M \text{ is } 12$$

which represents a number of resource elements in one resource block.

8. The wireless communication device of claim 4, wherein the $$N_{RB}^{RA}$$

is determined by:

$$N_{RB}^{RA} = \text{ceil}(((L_{RA}\cdot\Delta f_{RA})/(\Delta f\cdot M))), M \text{ is } 12$$

which represents a number of resource elements in one resource block.

* * * * *